United States Patent
Sato et al.

(10) Patent No.: US 7,378,151 B2
(45) Date of Patent: *May 27, 2008

(54) SEMICONDUCTOR NANOPARTICLE, AND A PROCESS OF MANUFACTURING THE SAME

(75) Inventors: Keiichi Sato, Tokyo (JP); Susumu Kuwabata, Osaka (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 202 days.

This patent is subject to a terminal disclaimer.

(21) Appl. No.: 10/505,125

(22) PCT Filed: Dec. 18, 2003

(86) PCT No.: PCT/JP03/16273

§ 371 (c)(1),
(2), (4) Date: Aug. 19, 2004

(87) PCT Pub. No.: WO2004/056938

PCT Pub. Date: Jul. 8, 2004

(65) Prior Publication Data

US 2005/0145853 A1    Jul. 7, 2005

(30) Foreign Application Priority Data

Dec. 19, 2002  (JP) ............................. 2002-368181
Mar. 10, 2003  (JP) ............................. 2003-063131

(51) Int. Cl.
B32B 15/02     (2006.01)
B32B 17/02     (2006.01)
B32B 19/00     (2006.01)
H01L 29/06     (2006.01)

(52) U.S. Cl. .................. 428/403; 257/21; 977/773; 977/783; 977/813; 977/830; 977/834; 977/904; 977/949

(58) Field of Classification Search ............. 257/21; 977/773–774, 783, 834, 904, 927, 949, 813, 977/830; 435/7.1; 428/403
See application file for complete search history.

(56) References Cited

U.S. PATENT DOCUMENTS 6,114,038 A    9/2000  Castro et al.

(Continued)

FOREIGN PATENT DOCUMENTS

EP    1 333 280 A1    1/2003

(Continued)

OTHER PUBLICATIONS

International Search Report dated Mar. 9, 2004.

(Continued)

Primary Examiner—Shouxiang Hu
(74) Attorney, Agent, or Firm—Reed Smith LLP; Stanley P. Fisher, Esq.; Juan Carlos A. Marquez, Esq.

(57) ABSTRACT

The invention provides a semiconductor nanoparticle comprising a semiconductor nanoparticle core on the surface of which electron-releasing groups are arranged, the semiconductor nanoparticle having a fluorescent property and water-solubility. The invention also provides a water-soluble semiconductor nanoparticle with an excellent fluorescent property that can be easily prepared by adding a surface-treating material for providing a semiconductor nanoparticle with one or more kinds of electron-releasing groups, and arranging the electron-releasing groups on the surface of the semiconductor nanoparticle core.

8 Claims, 21 Drawing Sheets

U.S. PATENT DOCUMENTS

| | | | |
|---|---|---|---|
| 6,306,610 B1 * | 10/2001 | Bawendi et al. | 435/7.1 |
| 7,318,957 B2 * | 1/2008 | Sato et al. | 428/403 |
| 2001/0023078 A1 | 9/2001 | Bawendi et al. | |
| 2002/0045045 A1 * | 4/2002 | Adams et al. | 428/403 |

FOREIGN PATENT DOCUMENTS

| | | |
|---|---|---|
| JP | 2002-38145 | 7/2000 |
| JP | 2002-121548 | 10/2000 |
| JP | 2002-121549 | 6/2001 |
| WO | WO 00/17655 A1 | 9/1999 |

OTHER PUBLICATIONS

Chen, Chia-Chun, et al. "Self-Assembly of Monolayers of Cadium Selenide Nanocrystals with Dual Color Emission", Langmuir, vol. 15, No. 20, 1999, pp. 6845-6850.

Kagaku Dai-Jiten (Encyclopedic Dictionary of Chemistry) published by Tokyo Kagaku-Dojin in 1989, at p. 1537, with English abstract.

* cited by examiner

SEMICONDUCTOR NANOPARTICLE, AND A PROCESS OF MANUFACTURING THE SAME

FIELD OF THE INVENTION

The present invention relates to a semiconductor nanoparticle and a process of manufacturing the same. In particular, the invention relates to a stable and water-soluble semiconductor nanoparticle and a process of manufacturing the same. The invention also relates to a fluorescent reagent and an optical device comprising the semiconductor nanoparticle.

BACKGROUND ART

Semiconductor nanoparticles with a particle size of less than 10 nm lie in a transition region between bulk semiconductor crystals and molecules. They exhibit physicochemical properties that are different from those of both bulk semiconductor crystals and molecules. In this region, the energy gap of the semiconductor nanoparticles increases with decreasing particle size, due to the emergence of the quantum size effect. This is further accompanied by the removal of the energy band degeneracy that is observed in bulk semiconductors, so that the orbits become discrete, with the lower end of the conduction band shifted to the negative side and the upper end of the valence band shifted to the positive side.

CdS semiconductor nanoparticles can be easily prepared by dissolving equimolar amounts of Cd and S precursors. The same is true for the manufacture involving CdSe, ZnS, ZnSe, HgS, HgSe, PbS, or PbSe, for example.

Semiconductor nanoparticles are gaining much attention because they are capable of emitting strong fluorescence with a narrow full width at half maximum, which makes it possible to produce a variety of fluorescent colors, thereby opening up a great variety of future applications.

However, the semiconductor nanoparticles obtained by simply mixing precursors as mentioned above exhibit a wide particle size distribution, and consequently the properties of the semiconductor nanoparticles cannot be fully utilized. Attempts have been made to accurately conduct particle size separation on semiconductor nanoparticles immediately after preparation that have a wide particle size distribution, using a chemical technique, and then separate and extract only those semiconductor nanoparticles with a specific particle size, with a view to achieving monodispersion. Such attempts include an electrophoretic separation process utilizing the fact that the surface charge possessed by nanoparticles varies depending on particle size, an exclusion chromatography process that takes advantage of the difference in retention time depending on particle size, and a size-selective precipitation process that utilizes the difference in dispersibility into an organic solvent depending on particle size.

The foregoing are examples of techniques for classifying the nanoparticles prepared by mixing precursors according to particle size. Another technique for achieving monodispersion of particle size has also been reported; namely, a size-selective photoetching process that utilizes the oxidizing dissolution of a metal chalcogenide semiconductor upon light irradiation in the presence of dissolved oxygen.

There is yet another method in which monodispersion of particle size is controlled at the stage of mixture of the precursors. One typical example is a reversed micelle method. In this method, amphipathic molecules, such as diisooctyl sodium sulfosuccinate, and water are mixed in an organic solvent, such as heptane, thereby forming a reverse micelle in the organic solvent, such that precursors are reacted with each other using only the aqueous phase in the reverse micelle. The size of the reverse micelle is determined by the quantitative ratio of the amphipathic molecules to the water, so that the size can be relatively uniformly controlled. The size of the thus prepared semiconductor nanoparticle is dependent on the size of the reverse micelle, so that it is possible to prepare semiconductor nanoparticles with relatively uniform particle sizes.

While the semiconductor nanoparticles obtained by the aforementioned processes exhibit a relatively narrow particle size distribution, the fluorescent properties of the thus prepared semiconductor nanoparticles exhibit a gradual fluorescent spectrum without any significant peaks. Moreover, the fluorescent spectrum exhibits a peak at a wavelength that is different from the theoretical value of the fluorescence that is supposed to be emitted by the semiconductor nanoparticles. Specifically, in addition to the bandgap fluorescence exhibited from the inside of the semiconductor nanoparticles, the aforementioned semiconductor nanoparticles emit totally separate fluorescence that is believed to be emitted by energy levels existing in the forbidden band of energy levels of the semiconductor nanoparticles.

The energy levels that emit this fluorescence are believed to exist mainly at a surface site of the semiconductor nanoparticles. This is a phenomenon that adversely affects the properties of the semiconductor nanoparticles with a narrow particle size distribution and has remained a problem to be solved, as the changes in fluorescent properties brought about by controlling the particle size of semiconductor nanoparticles originally appear in bandgap fluorescence.

As a typical solution to the above problem, a method has been attempted that would coat a semiconductor material as a core with a semiconductor material that has a larger bandgap than that of the core's semiconductor material, an inorganic material, and an organic material, thereby forming a multilayer structure in order to suppress the aforementioned fluorescence.

Typical examples of coating with an inorganic material include a coating of a CdSe nanoparticle with CdS (J. Phys. Chem. 100: 8927 (1996)), a coating of a CdS nanoparticle with ZnS (J. Phys. Chem. 92: 6320 (1988)), and a coating of a CdSe nanoparticle with ZnS (J. Am. Chem. Soc. 112: 1327 (1990)). With regard to the coating of a CdSe nanoparticle with ZnS, the Ostwald ripening phenomenon has been successfully utilized to obtain semiconductor nanoparticles with a sufficient fluorescent property by conducting the coating in a coordination solvent (J. Phys. Chem. B. 101: 9463 (1997)).

In the aforementioned multilayered semiconductor nanoparticle, the particle is coated with a material having a larger bandgap than that of the semiconductor nanoparticle and having no bandgap in the forbidden band thereof. This is in order to suppress the defective sites on the surface of the semiconductor nanoparticle so that the inherent fluorescent property of the semiconductor nanoparticle can be obtained.

In a method of surface processing in an aqueous solution, an improvement has been reported in the fluorescent property of the semiconductor nanoparticle in an alkali aqueous solution (J. Am. Chem. Soc. 109: 5655 (1987)). Although various experiments and reports have been made based on this report, none have successfully shed light on the mechanism (J. Phys. Chem. 100: 13226 (1996); J. Am. Chem. Soc. 122: 12142 (2000), for example). Moreover, none of the semiconductor nanoparticles in the alkali solution have sufficient reproducibility, and the reproduction conditions have not been identified. Furthermore, none of the experiments or reports has succeeded in isolating the final product.

As an example of the method for coating with an organic material, a synthesization process can be cited that utilizes the Ostwald ripening phenomena in a coordination solvent. It employs a coating material such as TOPO (trioctylphosphine) or hexadecylamine (HDA) as the coating material, for example, to obtain semiconductor nanoparticles with high light-emission properties (J. Am. Chem. Soc. 122: 12142 (2000), J. Lumin. 98, 49 (2002), for example). It should be noted, however, that the finally obtained semiconductor nanoparticle is not water-soluble.

The semiconductor nanoparticle obtained by the above-described methods is capable of suppressing a defect site to some extent and has the inherent properties of a semiconductor nanoparticle to some extent. However, in order to prepare such a semiconductor nanoparticle, a highly sophisticated technique is required, and in order to achieve high quality, a variety of equipment is required. Further, they are seriously deficient for the purpose of industrial production from the viewpoint of the cost of reagents and safety during high temperature reaction.

DISCLOSURE OF THE INVENTION

The properties of semiconductor nanoparticles are such that they are more durable than the currently employed reagents such as organic pigments, and they hardly fades. By varying the particle size, reagents that exhibit various spectra with narrow full widths at half maximum can be created from the same material. Thus, the semiconductor nanoparticle can be adapted not only for optical devices but also biopolymer detection and bioimaging purposes, for example, in a wide variety of applications. For these reasons, the semiconductor nanoparticles have been gaining attention in recent years, and the solving of the aforementioned problems has been an issue among researchers.

As mentioned above, the surface condition of the semiconductor nanoparticle is thought to be involved in the defective fluorescence of a monolayer semiconductor nanoparticle. Based on this hypothesis, the inventors conducted an analysis of the influence of the surface condition of the semiconductor nanoparticle. As a solution for the relevant defects, the inventors conducted studies, focusing on the fact that the emission properties of semiconductor nanoparticles in the aforementioned alkaline aqueous solution are very good. As a result, they eventually succeeded in isolating and purifying only those semiconductor nanoparticles that have been subjected to an alkaline treatment, and successfully shed light on the mechanism of light emission. Nevertheless, the resultant semiconductor nanoparticles were obtained in the form of a cottony precipitation that did not completely dissolve in water, such that the semiconductor nanoparticles were very inconvenient to handle.

The inventors proceeded with further research and studies and arrived at the present invention after realizing that the semiconductor nanoparticles could be rendered completely water-soluble by subjecting them to a treatment involving a group of specific compounds.

In a first aspect, the invention provides a semiconductor nanoparticle comprising a core on the surface of which electron-releasing groups are arranged, said semiconductor nanoparticle having a fluorescent property.

The semiconductor nanoparticle per se can be formed from a wide variety of known materials. Examples of the material of the core of the semiconductor nanoparticle include ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, and Si.

The electron-releasing groups arranged on the surface of the core of the semiconductor nanoparticle should preferably be of at least one type selected from the group consisting of —OR, —$OCH_2R$, —$OCOCH_2R$, —NHR, —$N(CH_2R)_2$, —$NHCOCH_2R$, —$CH_2R$, and —$C_6H_4R$, where R is one selected from the group consisting of hydrogen and substituted or unsubstituted hydrocarbon groups.

The surface of the semiconductor nanoparticle on which the electron-releasing groups are arranged should preferably be further stabilized by an ionic compound. As the ionic compound, at least one type should preferably be selected from the group consisting of ammonia, primary amines ($R^1NH_2$), secondary amines ($R^1R^2NH$), tertiary amines ($R^1R^2R^3N$), quaternary ammonium compounds ($R^4R^5R^6R^7N^+$), where $R^1$ to $R^7$ are each selected from the group consisting of hydrogen and substituted or unsubstituted hydrocarbon groups.

The semiconductor nanoparticle in which the electron-releasing groups are arranged on the surface of the core of the semiconductor nanoparticle is normally water-soluble as well as it has a fluorescent property.

In a second aspect, the invention provides a process of manufacturing a semiconductor nanoparticle having a fluorescent property, said process comprising adding a surface-treating material for providing the semiconductor nanoparticle with electron-releasing groups of one or more kinds, and arranging the electron-releasing groups on the surface of the semiconductor nanoparticle core.

Examples of the surface-treating material for providing the one or more types of electron-releasing groups include those with an unshared electron pair, such as ammonia, a variety of amines, and ether. Specifically, the surface-treating material should preferably be of one or more kind of nitrogenated compounds selected from the group consisting of ammonia, amines, ammoniums, nitriles, and isocyanates, or oxygenated compounds selected from the group consisting of alcohols, phenols, ketones, aldehydes, carboxylic acids, esters of organic or inorganic acids, ethers, acid amides, and acid anhydrides.

Of these nitrogenated compounds, preferable examples include one or more selected from the group consisting of ammonia, primary amines ($R^1NH_2$), secondary amines ($R^1R^2NH$), tertiary amines ($R^1R^2R^3N$), quaternary ammonium compounds ($R^4R^5R^6R^7N^+$), where $R^1$ to $R^7$ are each selected from the group consisting of hydrogen and substituted or unsubstituted hydrocarbon groups.

Examples of the aforementioned nitrogenated compounds include amines such as methylamine, ethylamine, propylamine, butylamine, dimethylamine, diethylamine, dipropylamine, dibutylamine, trimethylamine, triethylamine, tripropylamine, tributylamine, piperidine, tribenzylamine, aniline, pyridine, picoline, and tetramethylethylenediamine; quaternary ammoniums such as ammonium hydroxide, ammonium halide, and trialkylammonium; nitriles such as acetonitrile, benzonitrile, and tolunitrile; and amino acids, amido amines, etheramines, amine hydroxides, and carboxylic amines that include various functional groups in the molecules thereof.

Examples of the oxygenated compounds include alcohols with the number of carbon atoms 1 to 18, such as methanol, ethanol, propanol, pentanol, hexanol, octanol, dodecanol, octadecyl alcohol, oleyl alcohol, benzyl alcohol, phenylethyl alcohol, cumyl alcohol, isopropyl alcohol, isopropyl benzyl alcohol; phenols with the number of carbon atoms 6 to 20 that may include a lower alkyl group, such as phenol, cresol, xylenol, ethylphenol, propylphenol, nonyl phenol, cumyl phenol, and naphthol; ketones with the number of carbon atoms 3 to 15, such as acetone, methyl ethyl ketone, methyl isobutyl ketone, acetophenone, benzophenone, and benzoquinone; aldehydes with the number of carbon atoms 2 to 15, such as acetoaldehyde, propionaldehyde, octyl aldehyde, benzaldehyde, tolualdehyde, and naphthoaldehyde; organic acid esters with the number of carbon atoms 2 to 30, such as methyl formate, methyl acetate, ethyl acetate, vinyl acetate, propyl acetate, octyl acetate, cyclohexyl acetate, ethyl propylate, ethyl valerate, methyl chloroacetate, ethyl dichloroacetate, ethyl methacrylate, ethyl crotonate, ethyl cyclohexane carboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, di-n-hexyl cyclohexenecarboxylate, γ-butyrolactone, δ-valerolactone, coumarin, phthalide, and ethylene carbonate; acid halides with the number of carbon atoms 2 to 15, such as acetyl chloride, benzoyl chloride, toluic acid chloride, and anisic acid chloride; ethers or diethers with the number of carbon atoms 2 to 20, such as methyl ether, ethyl ether, isopropyl ether, butyl ether, amyl ether, tetrahydrofuran, and anisole; acid amides such as acetic acid amide, amide benzoate, toluic acid amide; and acid anhydrides such as acetic anhydride, phthalic anhydride, and benzoic anhydride.

A major feature of the semiconductor nanoparticle of the invention on which the aforementioned electron-releasing groups are arranged is that it is water-soluble, such that it can be handled with ease in various applications.

In a third aspect, the invention provides a fluorescent reagent that takes advantage of the fluorescent property of the aforementioned semiconductor nanoparticle. In a fourth aspect, the invention provides an optical device that takes advantage of the fluorescent property of the aforementioned semiconductor nanoparticle.

DESCRIPTION OF THE PREFERRED EMBODIMENTS

Figure 1:
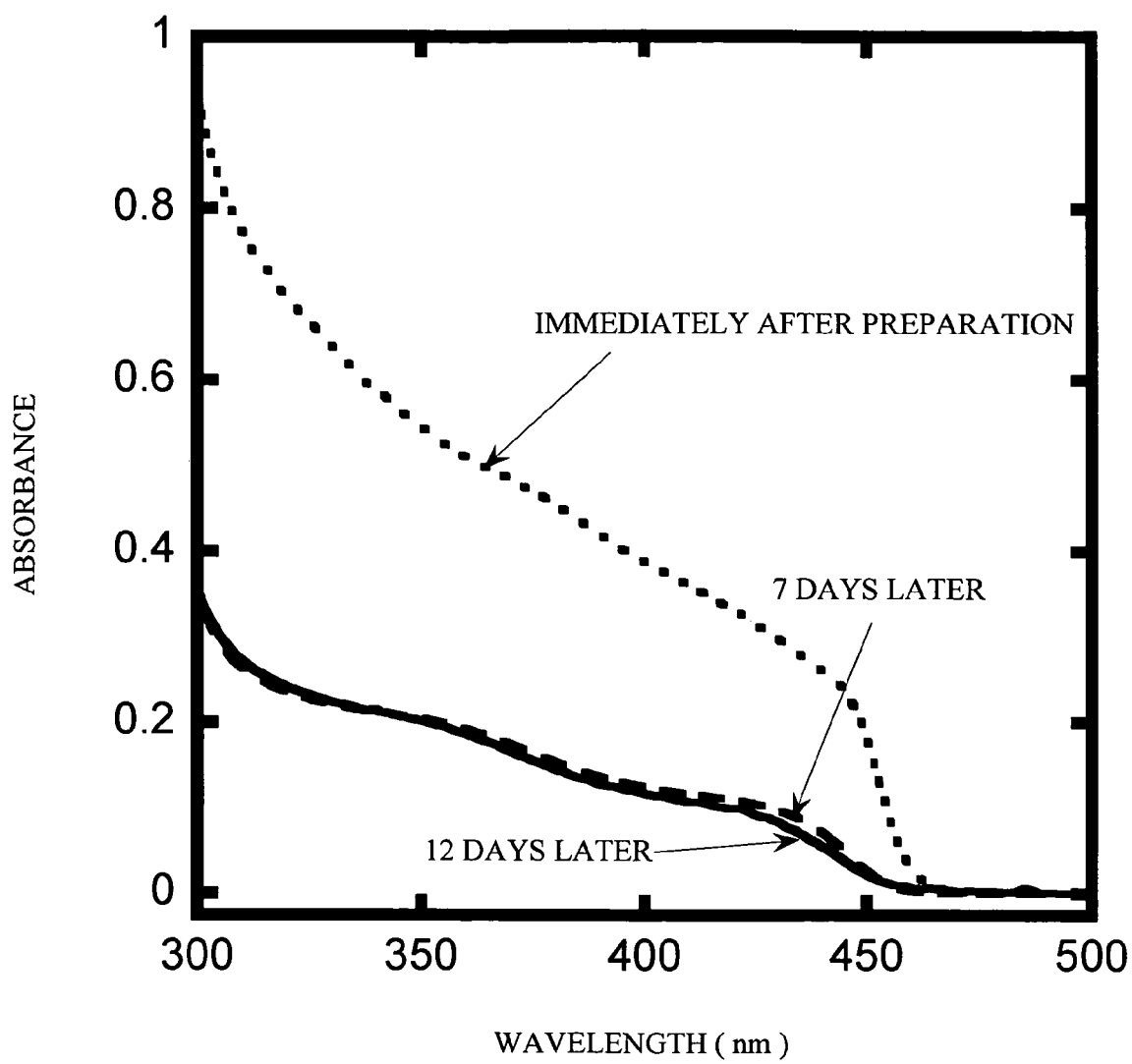
FIG. 1 shows the absorption spectrum of a semiconductor nanoparticle prepared in Example 1.

Hereafter, processes for manufacturing the semiconductor nanoparticle according to the invention will be described by way of examples. While the following examples involve the size-selective optical etching process, any other process may be employed as long as it is capable of producing a stabilized or modified semiconductor nanoparticle as a final product.

Process of Preparing a Semiconductor Nanoparticle

Semiconductor nanoparticles have a surface area that is extremely large in comparison with its volume, and they are easily agglomerated. Therefore, in order to allow the semiconductor nanoparticles to exist stably, measures must be taken to prevent the collision or fusion of particles. A variety of methods have so far been devised for this purpose, which can be roughly divided into: the physical isolation of individual semiconductor nanoparticles by taking them into a solid and a polymer matrix; and the inactivation of the particle surface by chemically modifying a metal ion site on the particle surface with a low-molecular-weight organic material that has a high level of ability of forming a complex with the metal ion site. Based on the latter concept, hexametaphosphate is used as a stabilizing agent in the present method.

One thousand ml of an aqueous solution of sodium hexametaphosphate (0.1 mmol) and cadmium perchlorate (0.2 mmol) is prepared, and the pH is adjusted to 10.3. Then, bubbling is performed in the solution using nitrogen gas, and hydrogen sulfide gas (0.2 mmol) is injected into the solution while stirring the same violently. The stirring is continued for a time during which the color of the solution changes from being optically transparent colorless to optically transparent yellow.

At this time, although semiconductor nanoparticles that have been stabilized by hexametaphosphate already exist in the solution, they have a wide particle size distribution with their standard deviation extending more than 15% of the average particle size. The overall fluorescent intensity of the semiconductor nanoparticles in this state is very weak.

The size-selective photoetching method is described below. The physicochemical properties of semiconductor nanoparticles appear in dependence on particle size due to the quantum size effect. Thus, physical properties in this state are averaged, so that the properties of the semiconductor nanoparticles cannot be fully exploited. Accordingly, it is necessary to accurately conduct a particle-size separation on the semiconductor nanoparticles immediately after preparation, which have a wide particle-size distribution, using a chemical technique, so that only semiconductor nanoparticles of a specific particle size can be isolated and extracted to achieve monodispersion. As a method of performing this operation, the size-selective photoetching method can be employed. This method utilizes the fact that the energy gap increases with decreasing size of the particle size of the semiconductor nanoparticles due to the quantum size effect, and that a metal chalcogenide semiconductor undergoes oxidizing melting as it is irradiated with light in the presence of dissolved oxygen. Specifically, when semiconductor nanoparticles with a wide particle-size distribution are irradiated with monochromatic light of a wavelength shorter than the wavelength of the absorption edge of the particles, semiconductor nanoparticles with larger particle sizes are selectively optically excited and dissolved, thereby obtaining smaller semiconductor nanoparticles with uniform particle size.

First, bubbling is performed using nitrogen gas in the above-described semiconductor nanoparticle solution that is stabilized by hexametaphosphate and that has a wide particle-size distribution. Bubbling is further conducted using oxygen for 10 min. Then, methylviologen is added to the solution to 50 µmol/L, and laser is irradiated while stirring. The irradiation of monochromatic light in the present invention is conducted to optically dissolve the semiconductor nanoparticles, and the wavelength of the monochromatic light is 450 nm. By changing the wavelength of the monochromatic light, the fluorescent wavelength at the peak of the fluorescent spectrum of the semiconductor nanoparticles can be controlled.

When the thus obtained semiconductor nanoparticles are irradiated with light with wavelength 476.5 nm, the particles exhibit a very narrow particle-size distribution where an average particle size is 3.2 nm and the standard deviation is 0.19 nm, which means the standard deviation is about 6% of the average particle size. Thus, a solution of semiconductor nanoparticles that is extremely close to monodispersion can be obtained.

Figure 21:
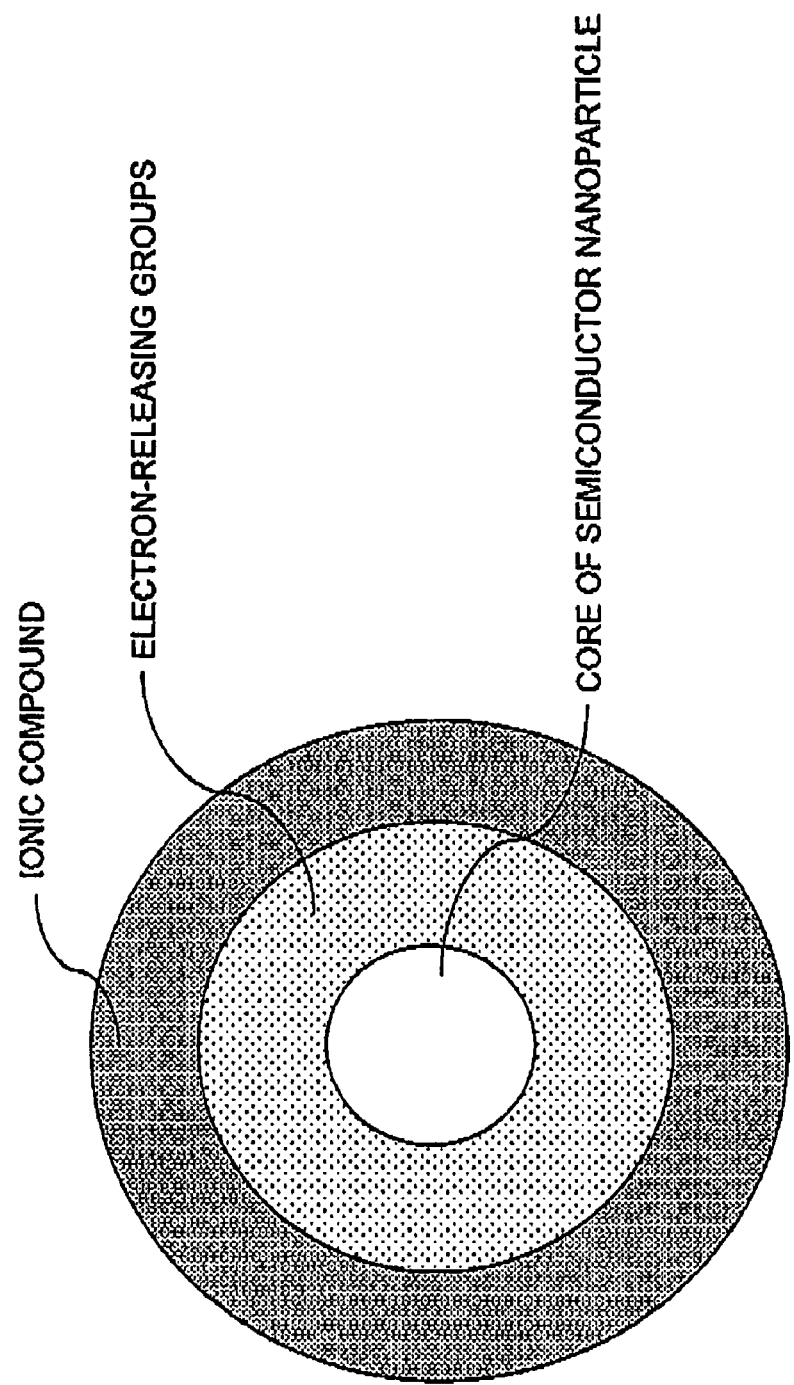
FIG. 21 shows a semiconductor nanoparticle prepared according to the present invention.

In this process, the semiconductor nanoparticles (for example, the embodiment depicted in FIG. 21) in the solution are monodispersed and come to produce band gap fluorescence that exhibits a narrow full width at half maximum spectrum corresponding to the irradiating monochromatic light and the particle size of the semiconductor nanoparticles. The defective fluorescence, which is believed mainly due to the energy level on the surface of the semiconductor nanoparticles, is emitted with a stronger intensity than the band gap fluorescence intensity. Such defective fluorescence is originally considered a factor obstructive to the properties of the semiconductor nanoparticles and should therefore be suppressed.

Method for Modification of the Surface of Semiconductor Nanoparticles and Purification In order to purify the monodispersed semiconductor nanoparticles obtained by the above-described method that were stabilized by hexametaphosphate, surface modification was provided by adding 300 µL of mercaptopropionic acid (MPA) and then stirring for several hours. The solution was then ultrafiltrated to remove the methylviologen, hexametaphosphate, unreacted thiol compounds, and ions that had dissolved during photoetching, for example, in the aqueous solution, thereby obtaining a solution of semiconductor nanoparticles stabilized by a pure thiol compound. Thereafter, 1 L of the resultant semiconductor nanoparticles the surface of which was modified by the thiol compound was condensed by ultrafiltration to 10 mL, and then washing with pure water was conducted.

Methods of Treating the Surface of the Semiconductor Nanoparticles

A surface treatment was conducted on the purified and thiol-modified nanoparticles obtained by the above method. Examples of surface treatment are described below.

EXAMPLE 1

Figure 2:
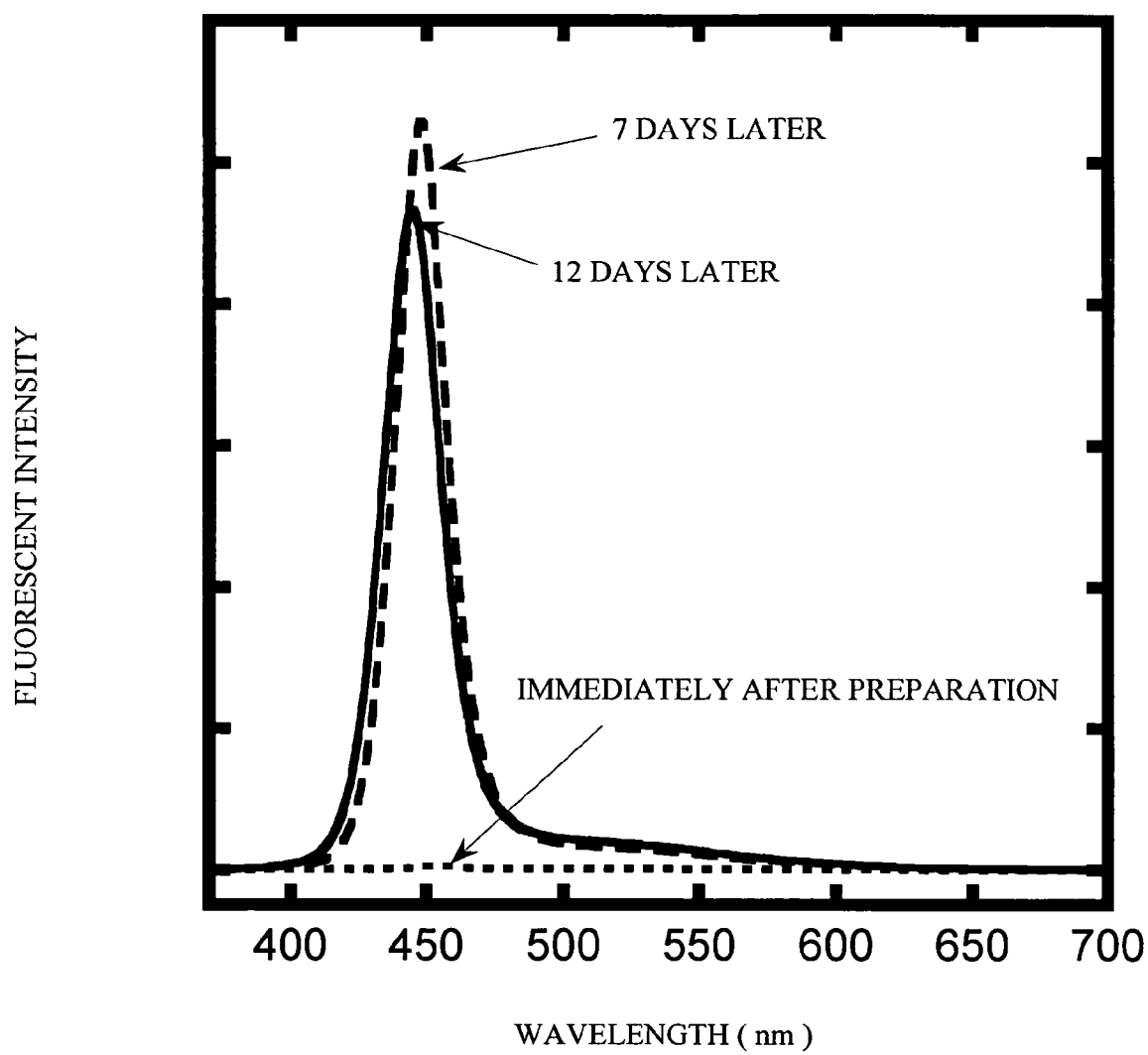
FIG. 2 shows the fluorescent spectrum of a semiconductor nanoparticle prepared in Example 1.

An aqueous solution of the purified and thiol-modified nanoparticles was diluted to an absorbance of 0.5 using an aqueous solution of 0.1 M $NH_3$-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 1, and temporal changes in the fluorescent intensity are shown in FIG. 2.

EXAMPLE 2

Figure 3:
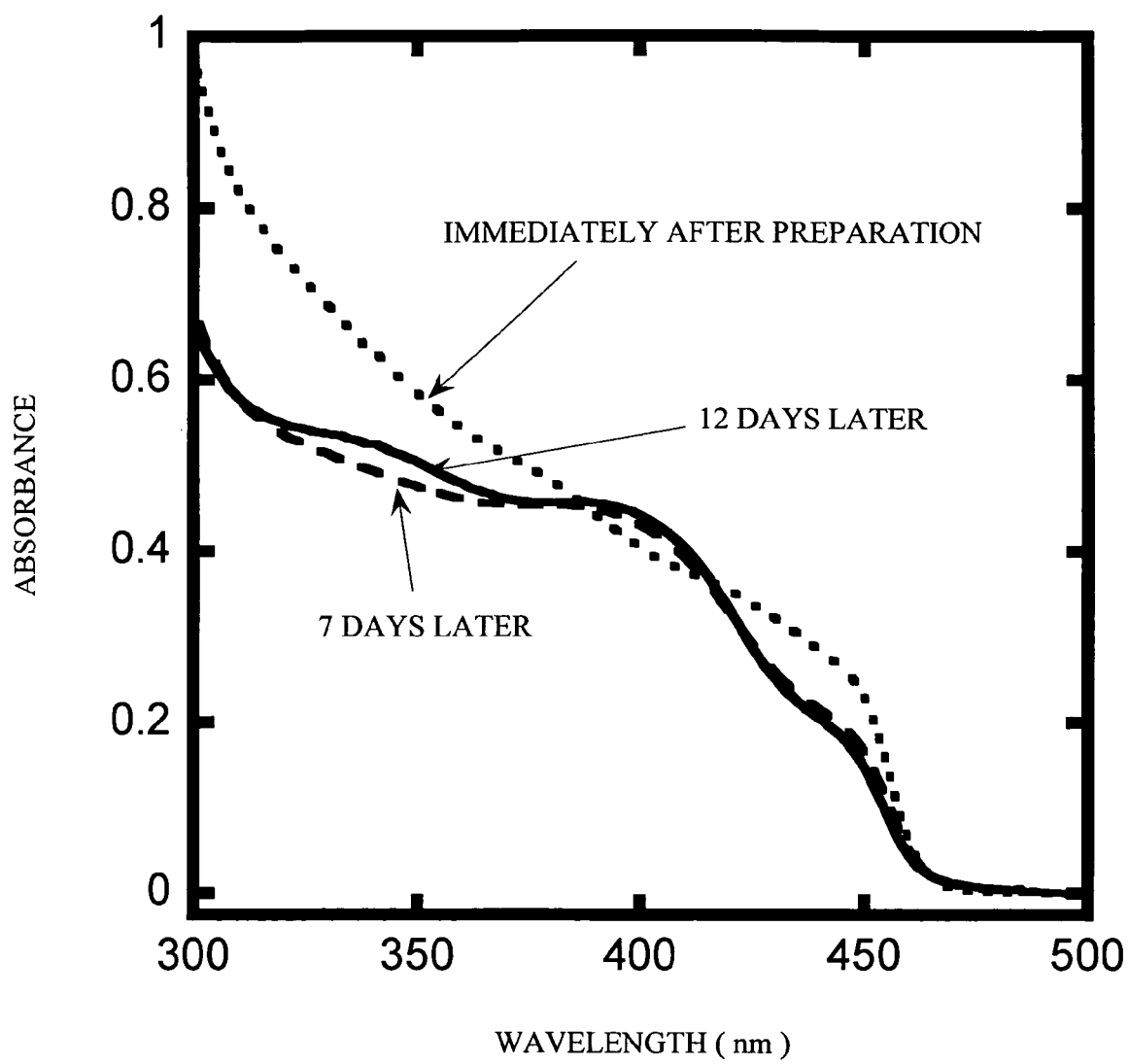
FIG. 3 shows the absorption spectrum of a semiconductor nanoparticle prepared in Example 2.
Figure 4:
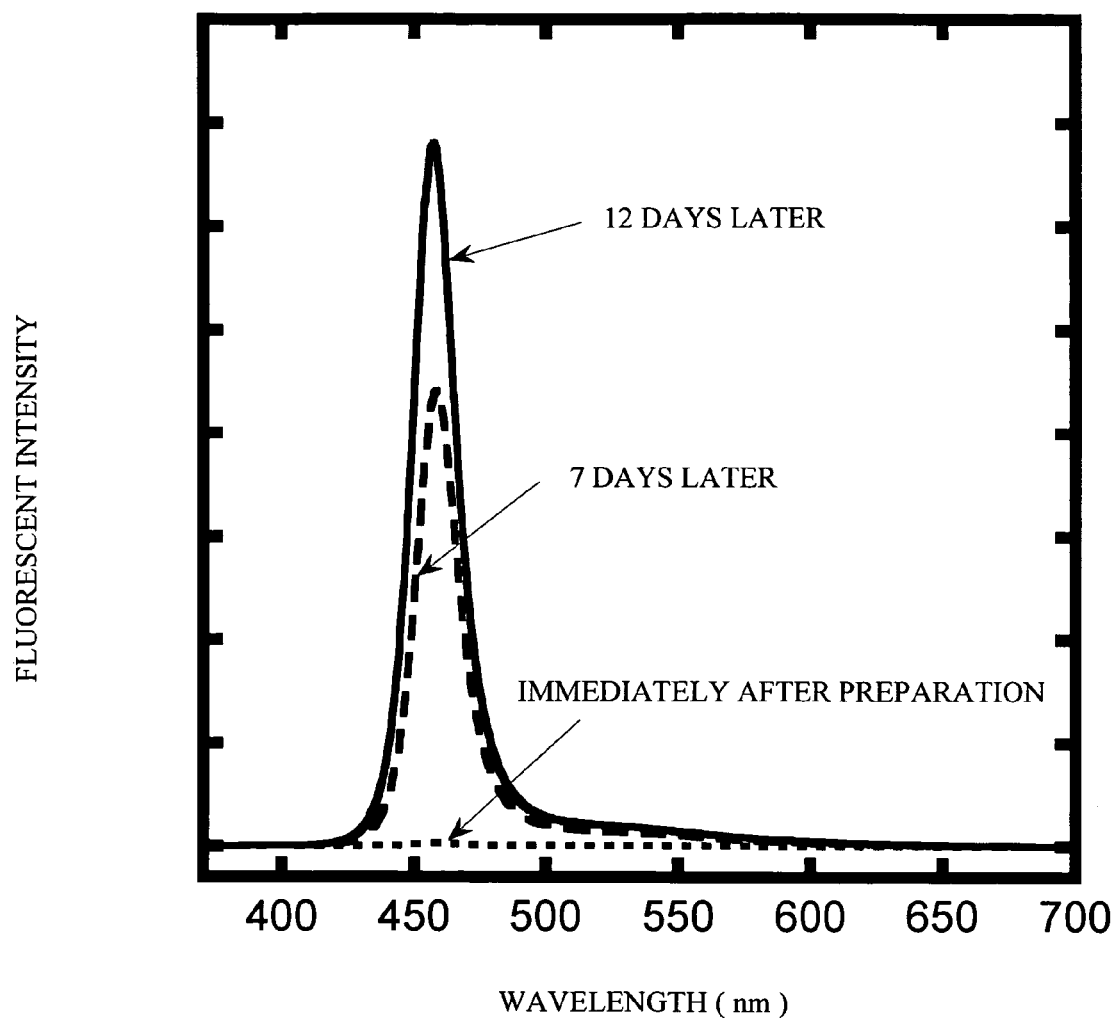
FIG. 4 shows the fluorescent spectrum of the semiconductor nanoparticle prepared in Example 2.

An aqueous solution of the purified and thiol-modified nanoparticles was diluted to an absorbance of 0.5 using an aqueous solution of 0.1 M dimethylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 3, and temporal changes in the fluorescent intensity are shown in FIG. 4.

EXAMPLE 3

Figure 5:
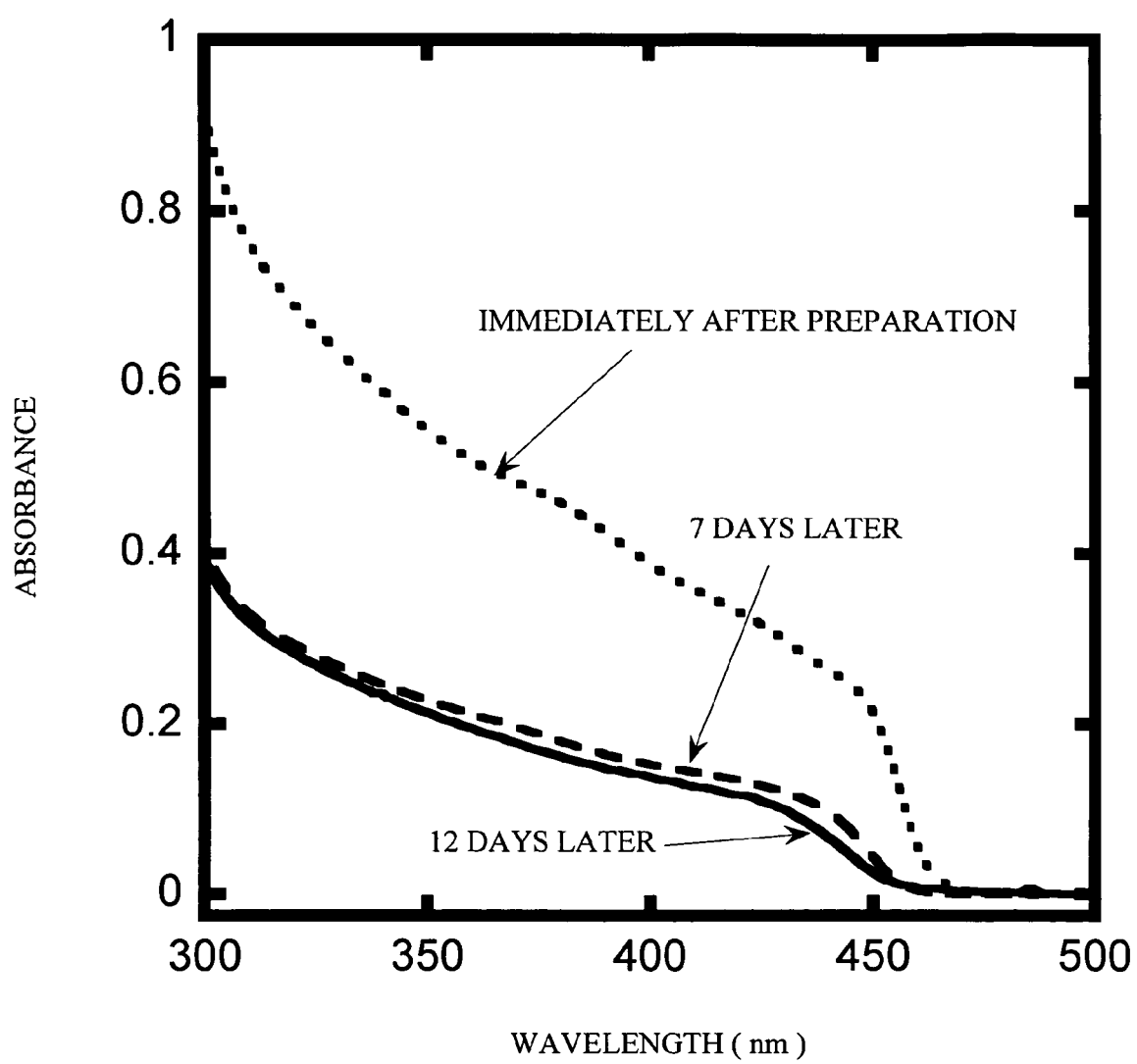
FIG. 5 shows the absorption spectrum of a semiconductor nanoparticle prepared in Example 3.
Figure 6:
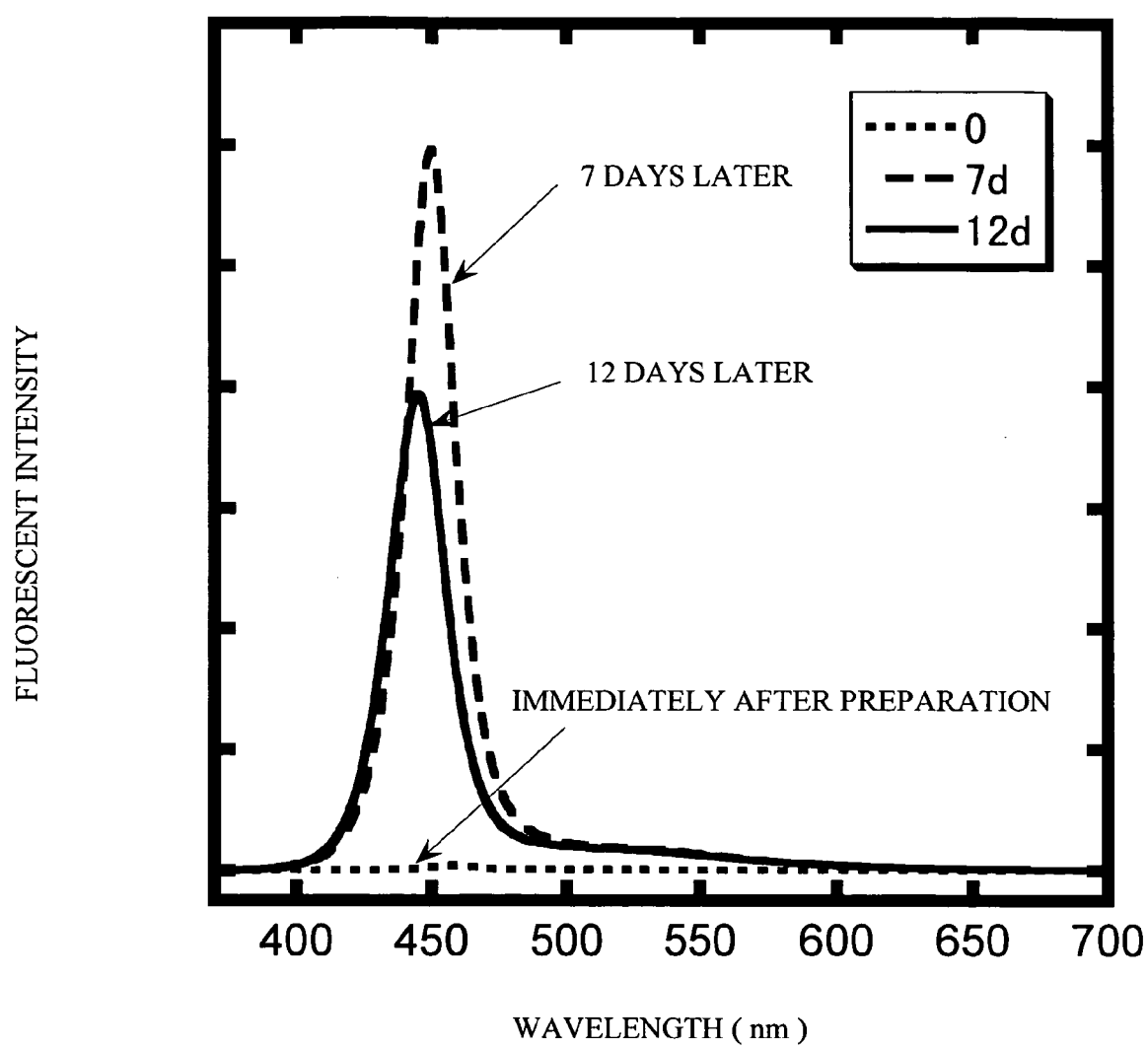
FIG. 6 shows the fluorescent spectrum of the semiconductor nanoparticle prepared in Example 3.

An aqueous solution of the purified and thiol-modified nanoparticles was diluted to an absorbance of 0.5 using an aqueous solution of 0.1 M tetramehylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 5, and temporal changes in the fluorescent intensity are shown in FIG. 6.

EXAMPLE 4

Figure 7:
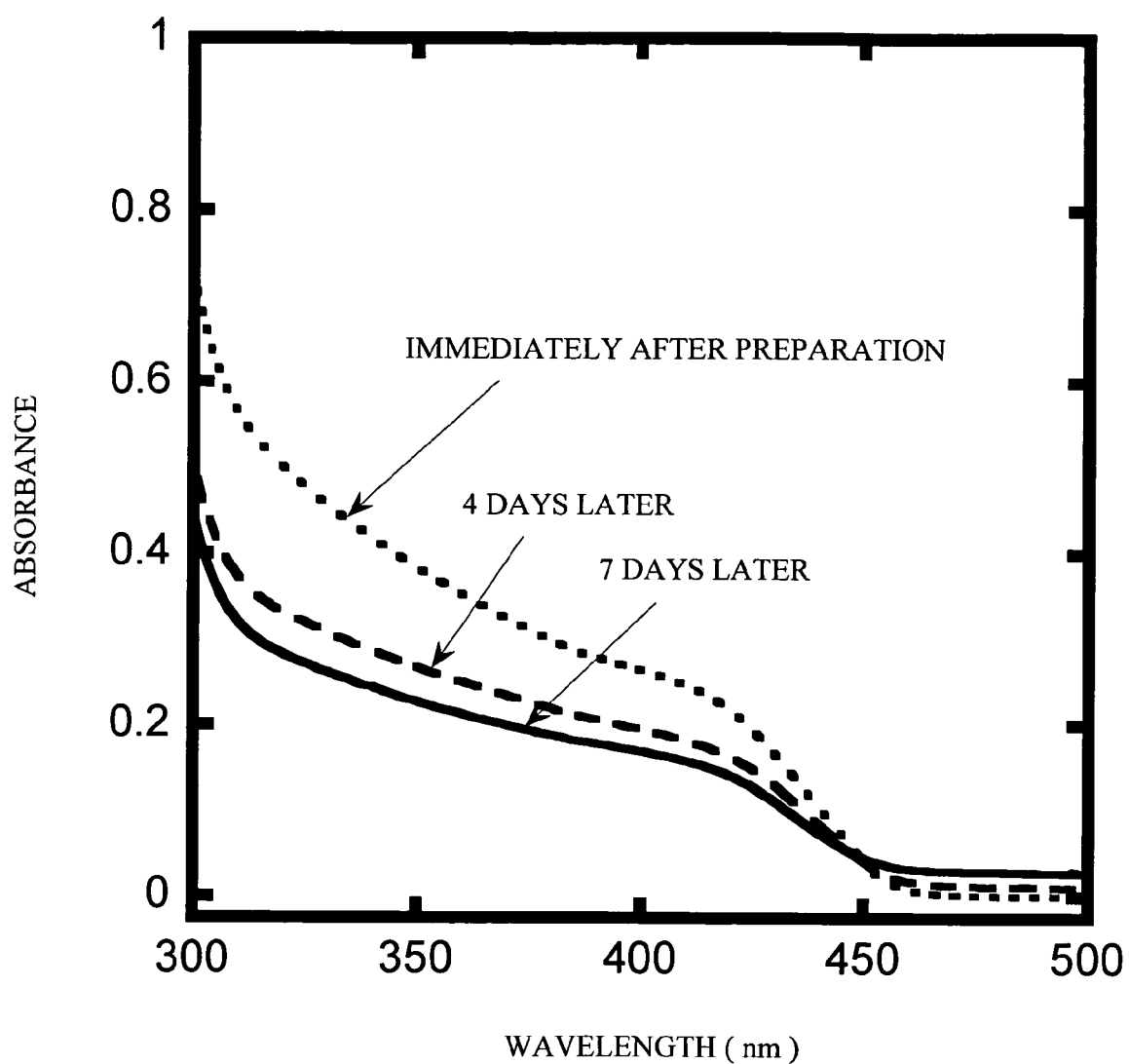
FIG. 7 shows the absorption spectrum of a semiconductor nanoparticle prepared in Example 4.
Figure 8:
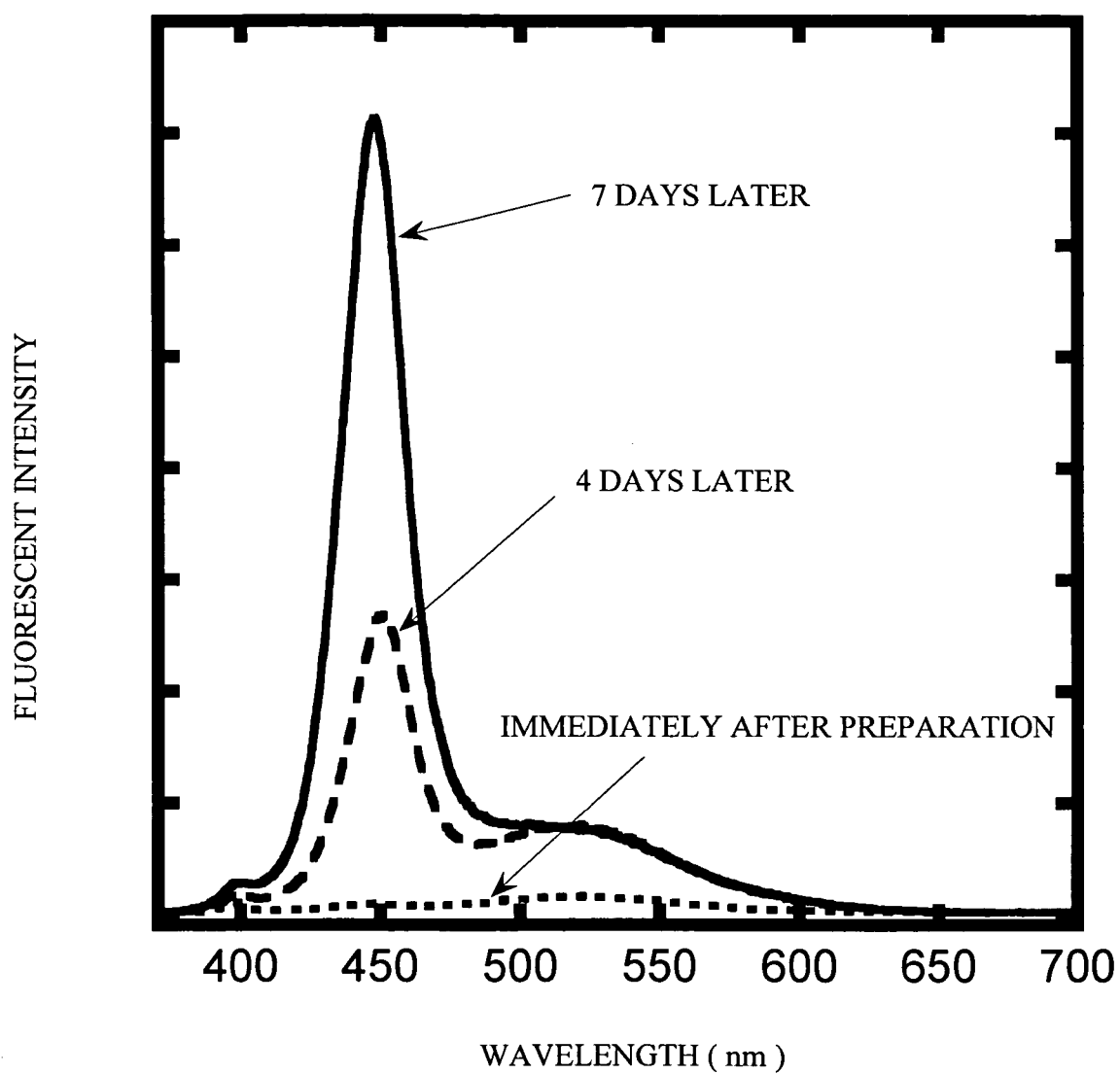
FIG. 8 shows the fluorescent spectrum of the semiconductor nanoparticle prepared in Example 4.

Beta-alanine was added to an aqueous solution of the purified and thiol-modified nanoparticles, which was then allowed to stand for several days to several weeks in an environment of pH 9, thereby obtaining a semiconductor nanoparticle solution with high-emission properties. The resultant solution was optically transparent yellow and had superior emission properties. Temporal changes in the absorbance in accordance with this preparation process are shown in FIG. 7, and temporal changes in the fluorescent intensity are shown in FIG. 8.

EXAMPLE 5

Figure 9:
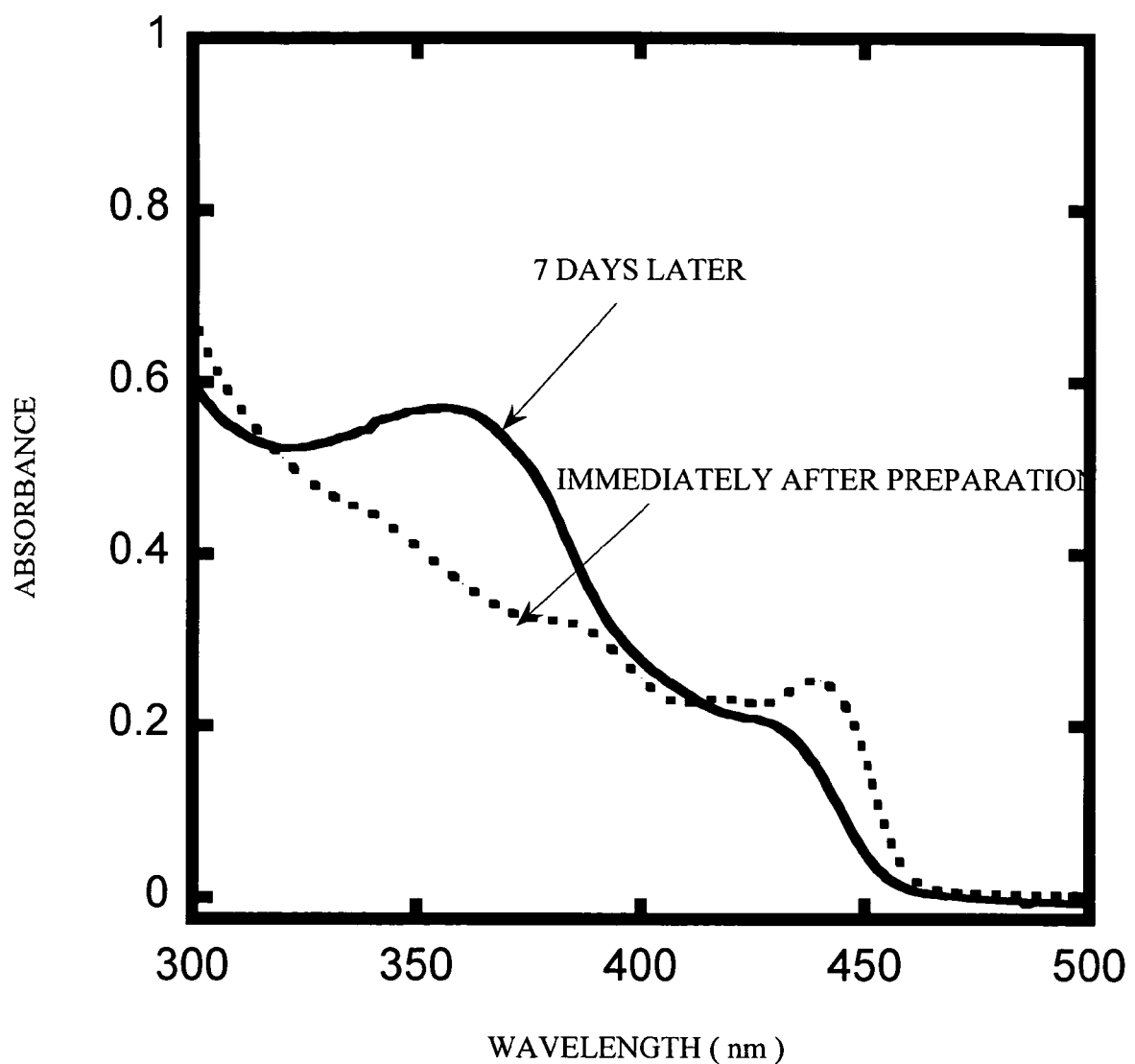
FIG. 9 shows the absorption spectrum of a semiconductor nanoparticle prepared in Example 5.
Figure 10:
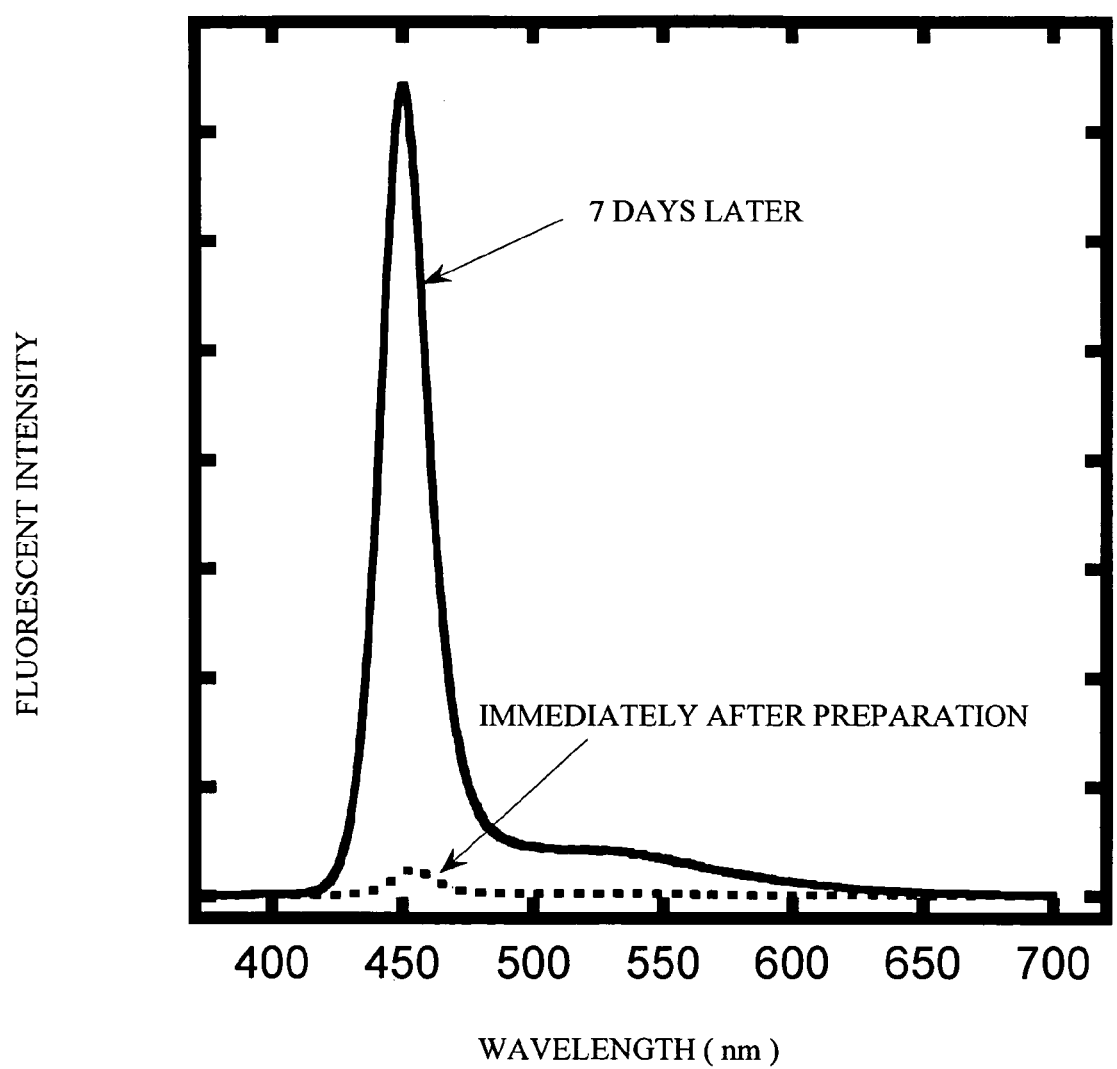
FIG. 10 shows the fluorescent spectrum of a semiconductor nanoparticle prepared in Example 5.

An aqueous solution of the purified and thiol-modified nanoparticles was diluted to an absorbance of 0.5 using an aqueous solution of 0.1 M methylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 9, and temporal changes in the fluorescent intensity are shown in FIG. 10.

EXAMPLE 6

Figure 11:
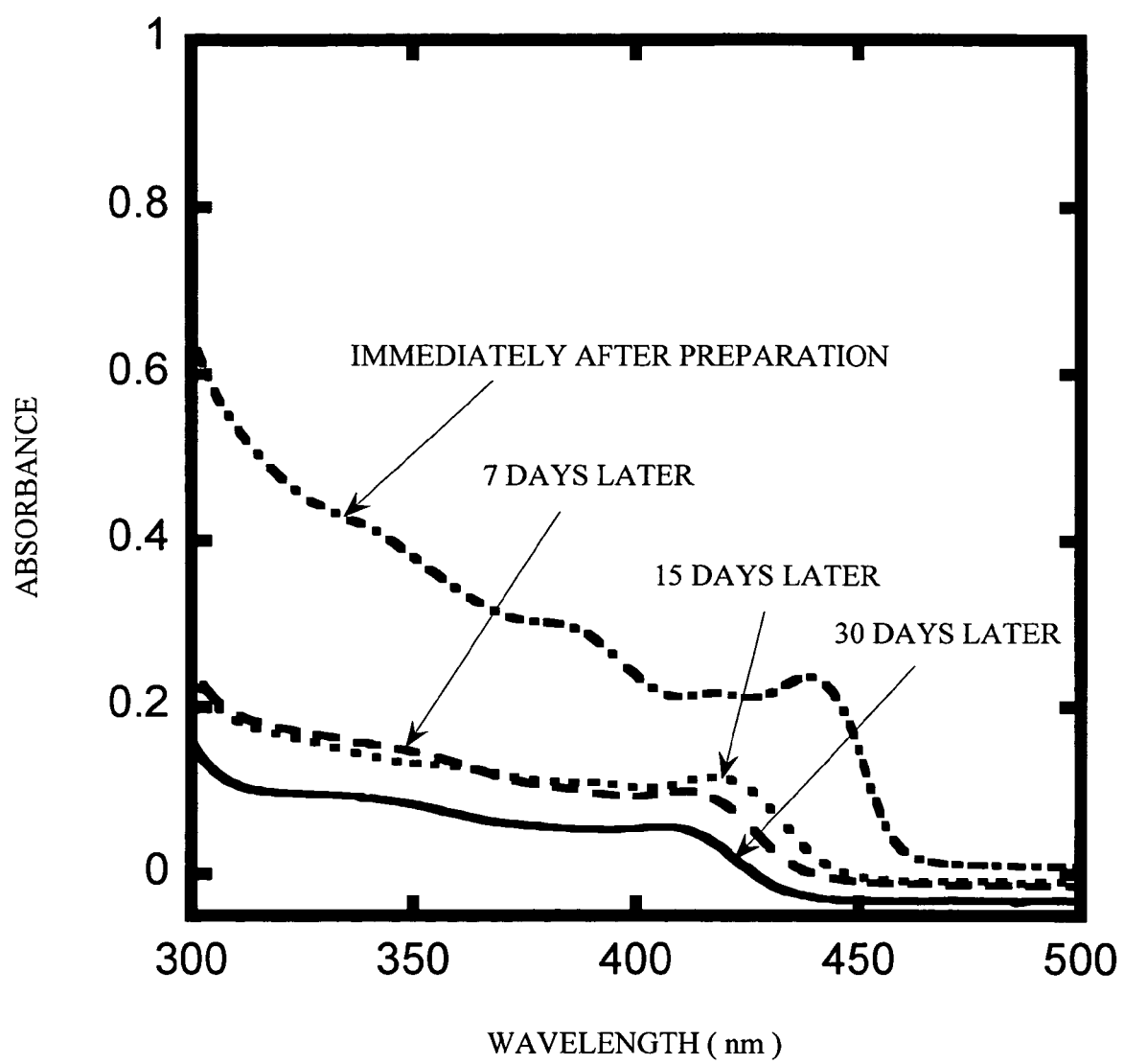
FIG. 11 shows the absorption spectrum of a semiconductor nanoparticle prepared in Example 6.
Figure 12:
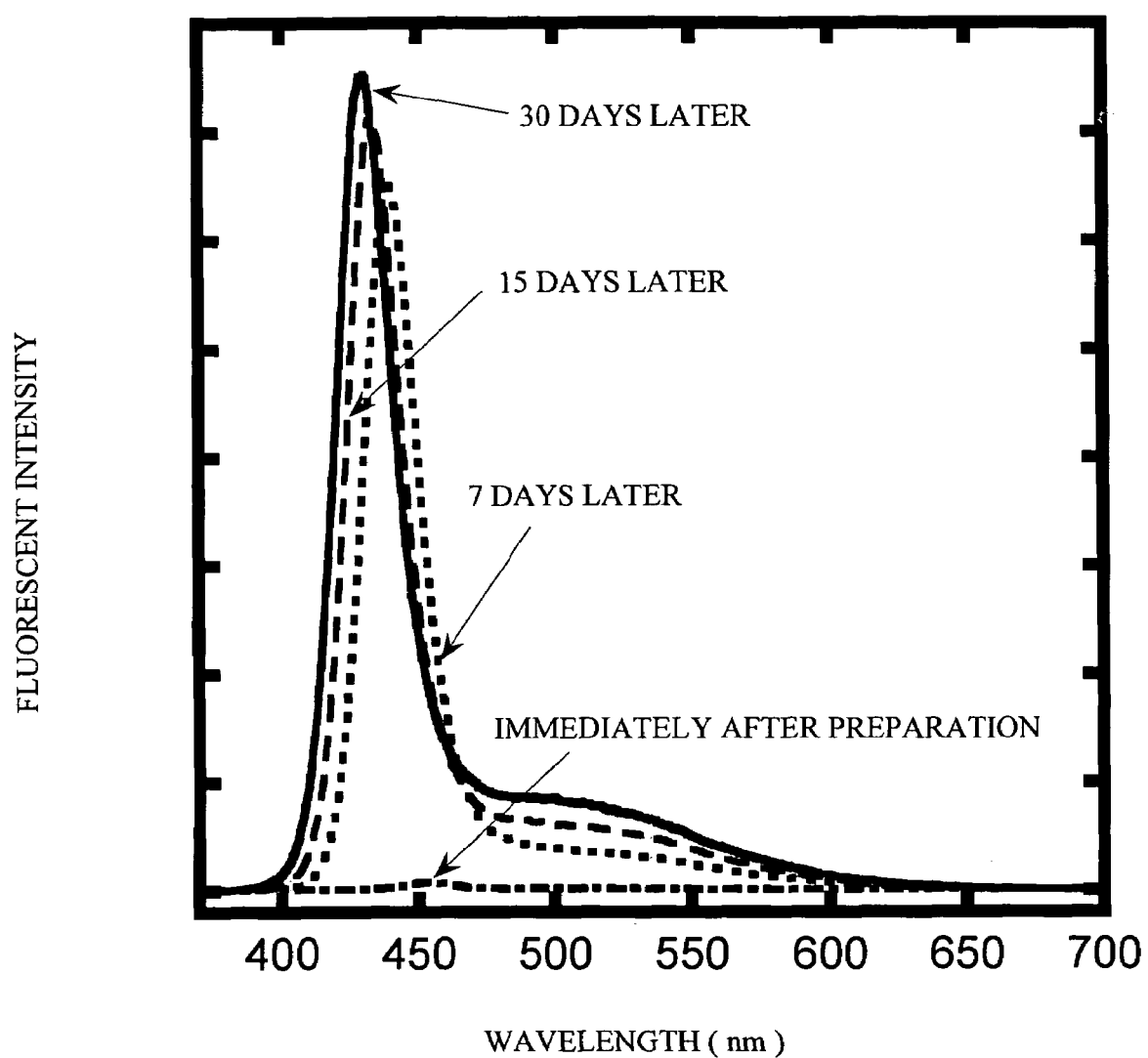
FIG. 12 shows the fluorescent spectrum of the semiconductor nanoparticle prepared in Example 6.

An aqueous solution of the purified and thiol-modified nanoparticles was diluted to an absorbance of 0.5 using an aqueous solution of 0.1 M trimethylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 11, and temporal changes in the fluorescent intensity are shown in FIG. 12.

EXAMPLE 7

Figure 13:
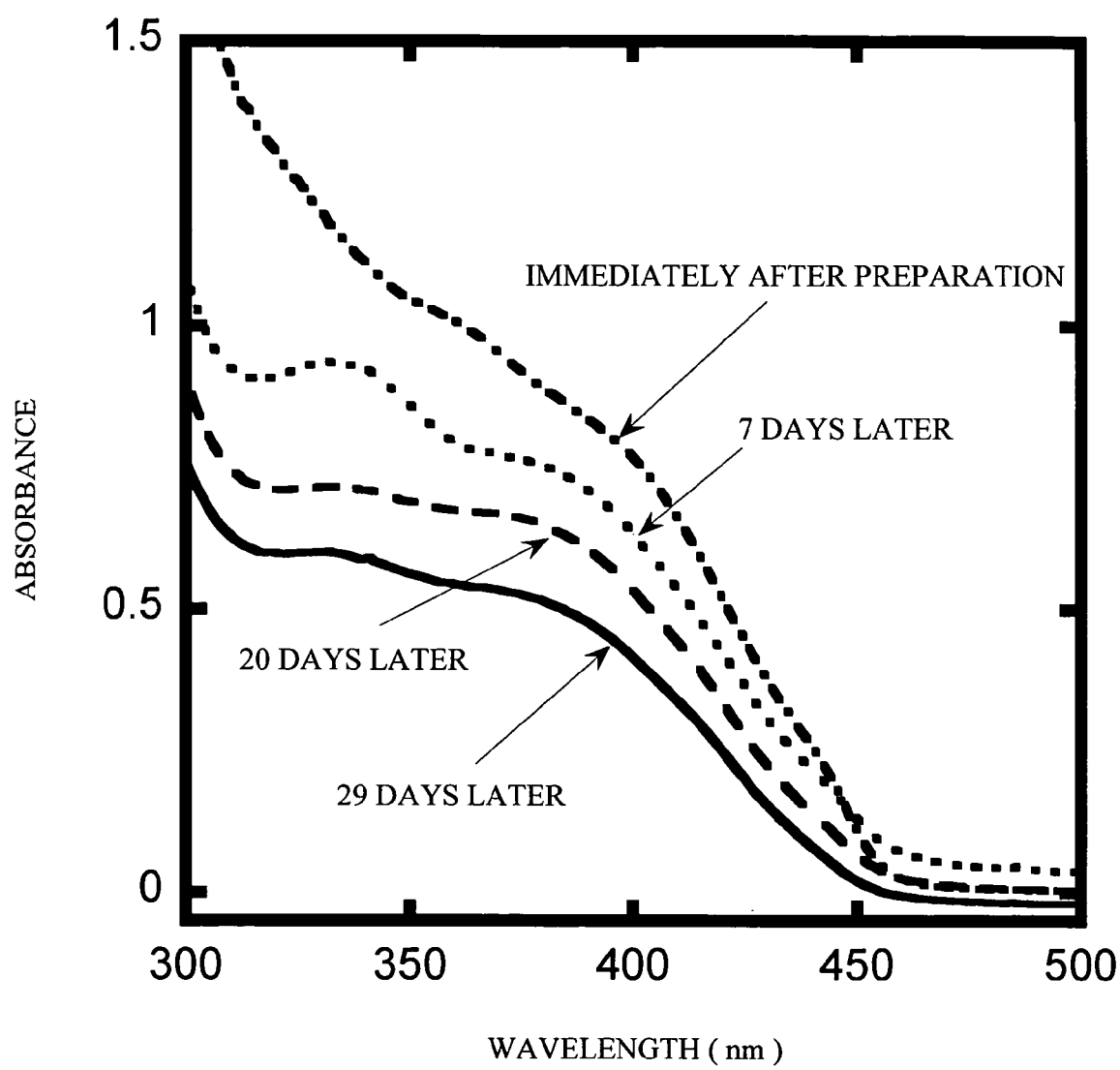
FIG. 13 shows the absorption spectrum of a semiconductor nanoparticle prepared in Example 7.
Figure 14:
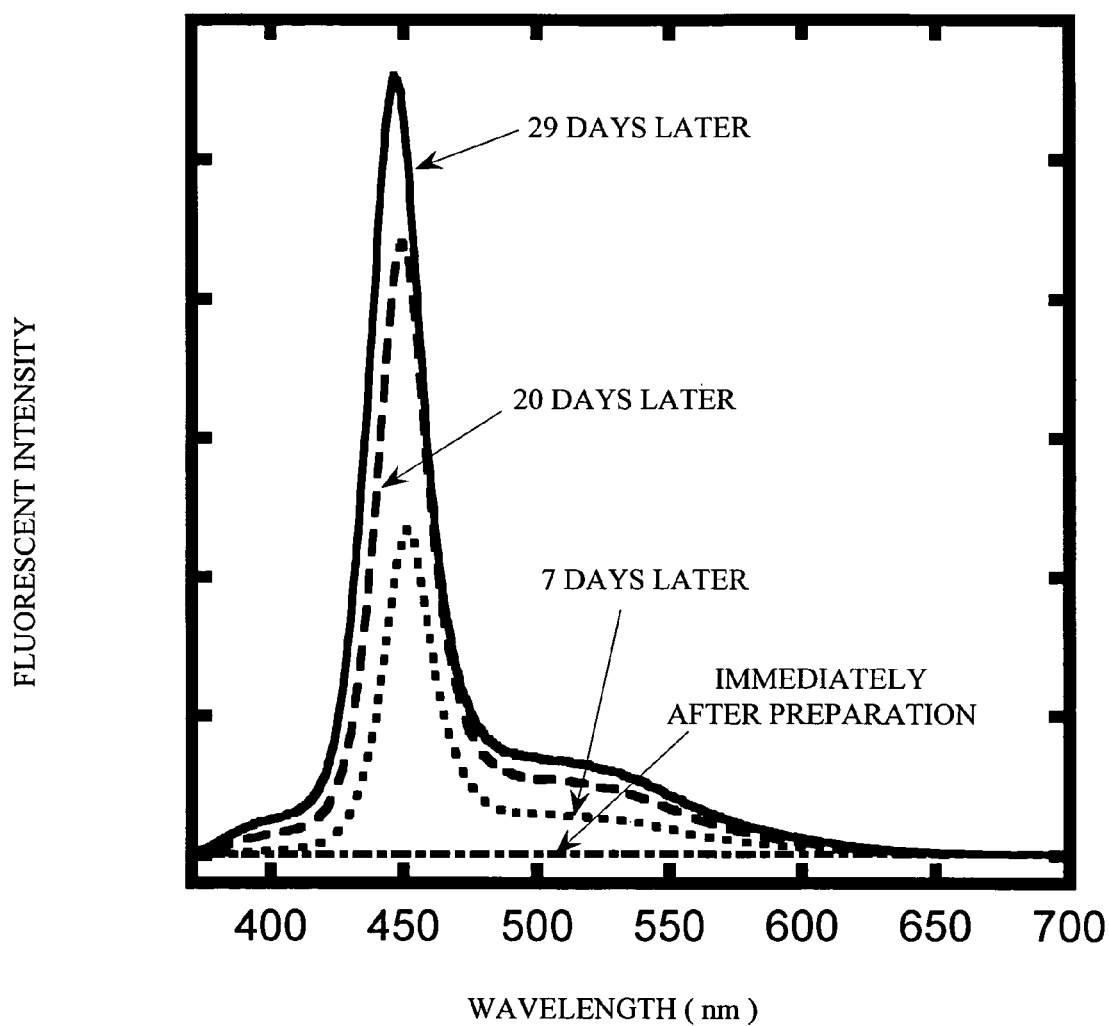
FIG. 14 shows the fluorescent spectrum of the semiconductor nanoparticle prepared in Example 7.

An aqueous solution of the purified and thiol-modified nanoparticles was diluted to an absorbance of 0.5 using an aqueous solution of 0.1 M propylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 13, and temporal changes in the fluorescent intensity are shown in FIG. 14.

EXAMPLE 8

Figure 15:
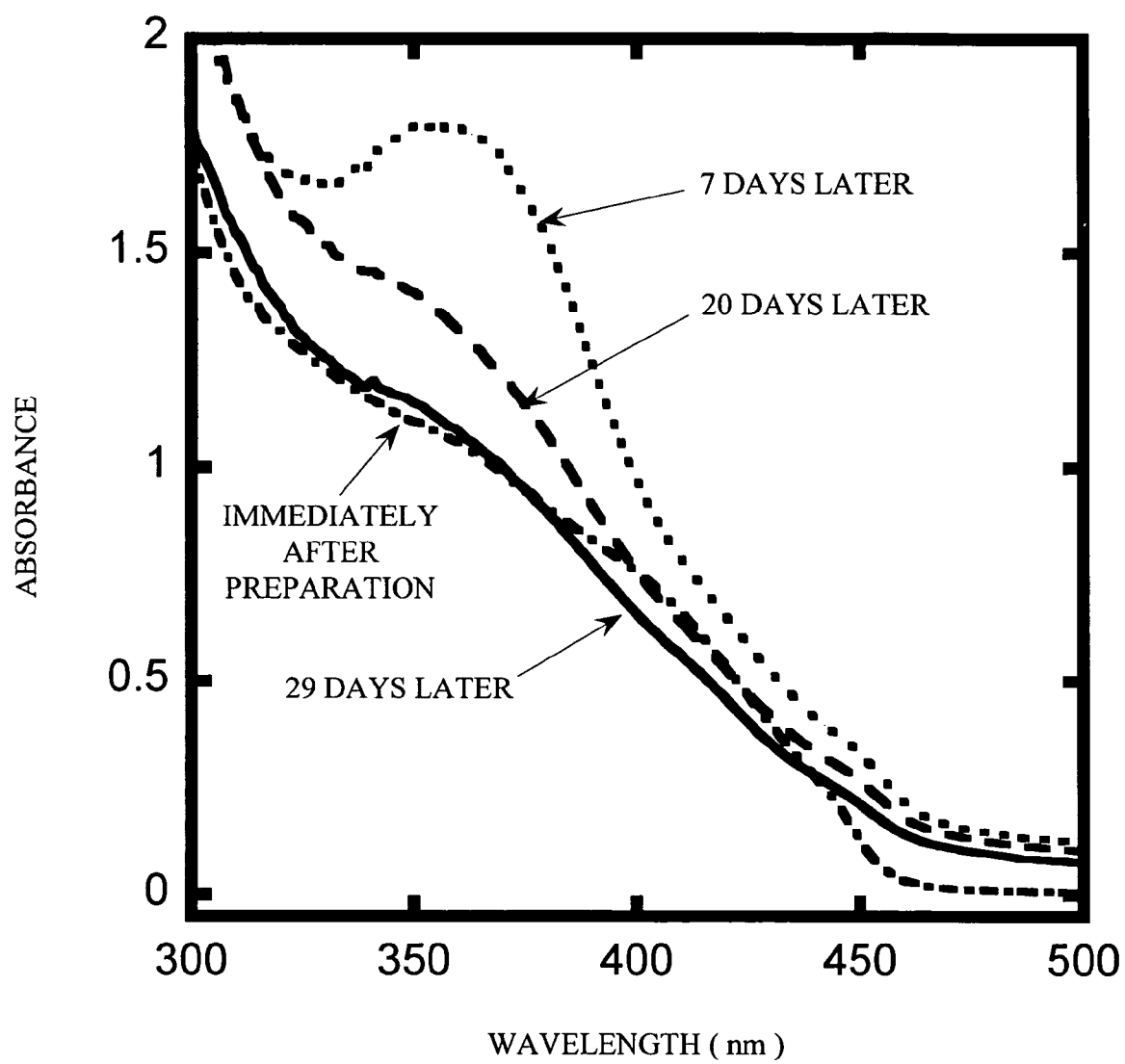
FIG. 15 shows the absorption spectrum of a semiconductor nanoparticle prepared in Example 8.
Figure 16:
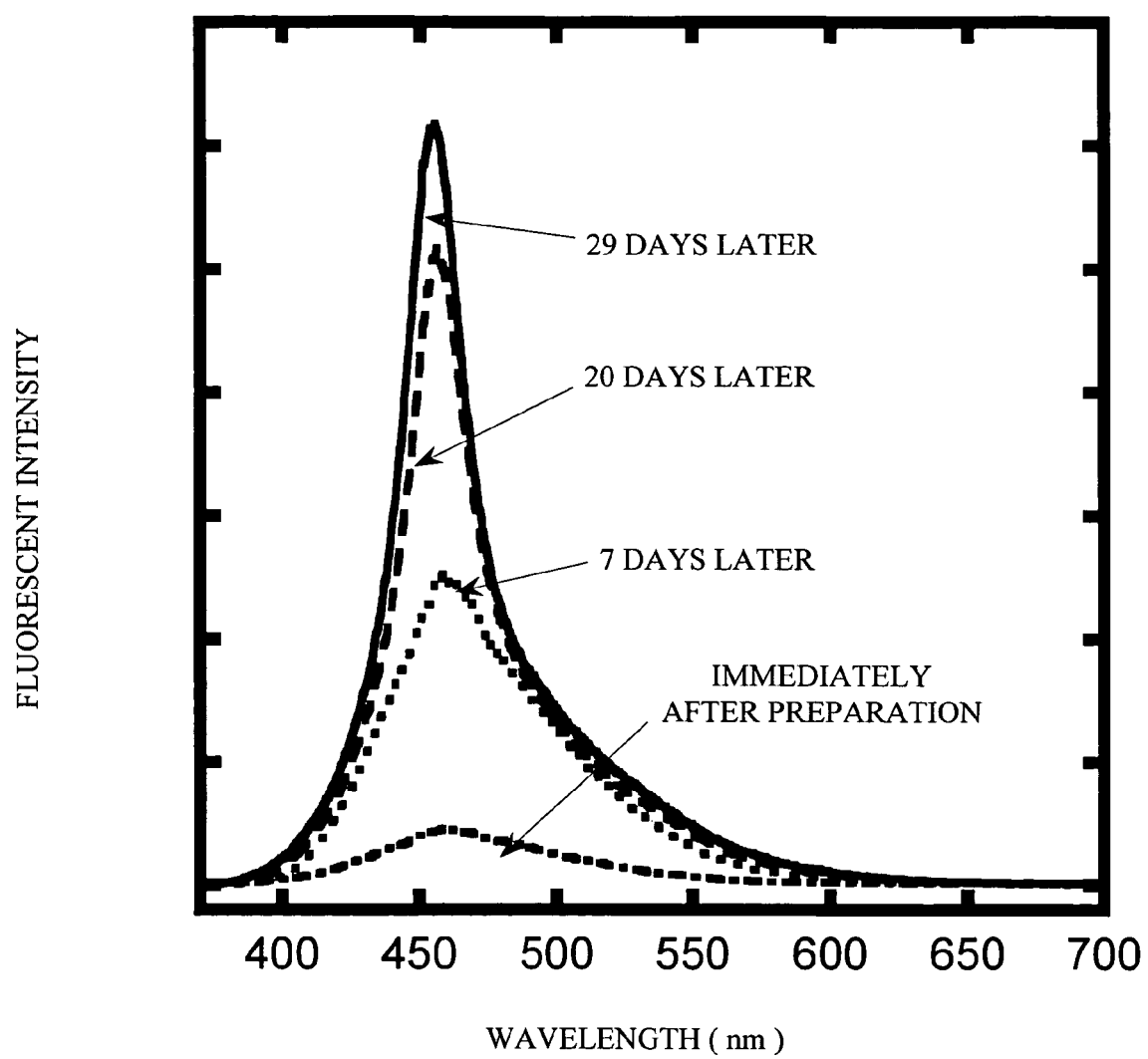
FIG. 16 shows the fluorescent spectrum of the semiconductor nanoparticle prepared in Example 8.

An aqueous solution of the purified and thiol-modified nanoparticles was diluted to an absorbance of 0.5 using an aqueous solution of 0.1 M dipropylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 15, and temporal changes in the fluorescent intensity are shown in FIG. 16.

EXAMPLE 9

Figure 17:
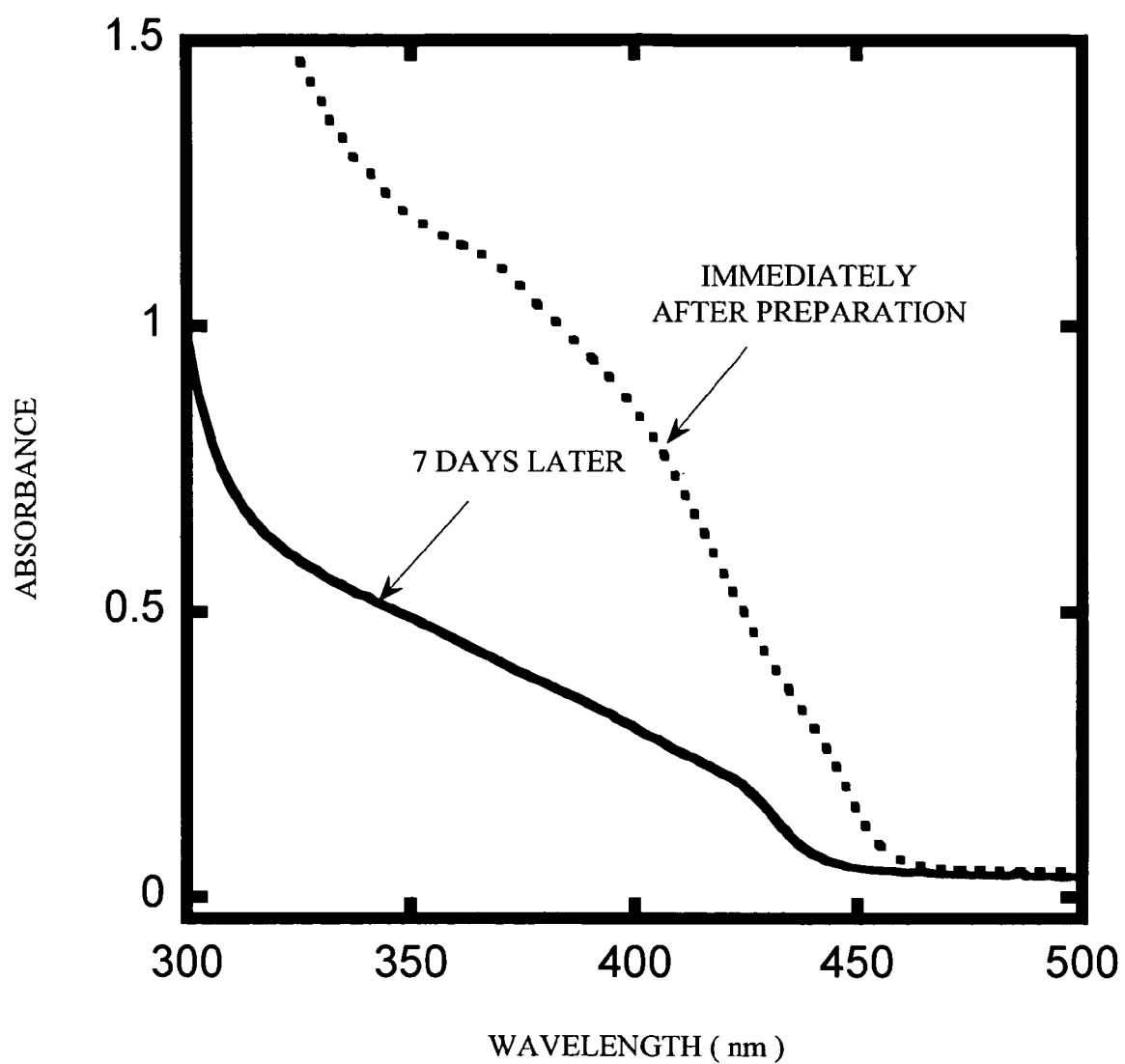
FIG. 17 shows the absorption spectrum of the semiconductor nanoparticle prepared in Example 9.
Figure 18:
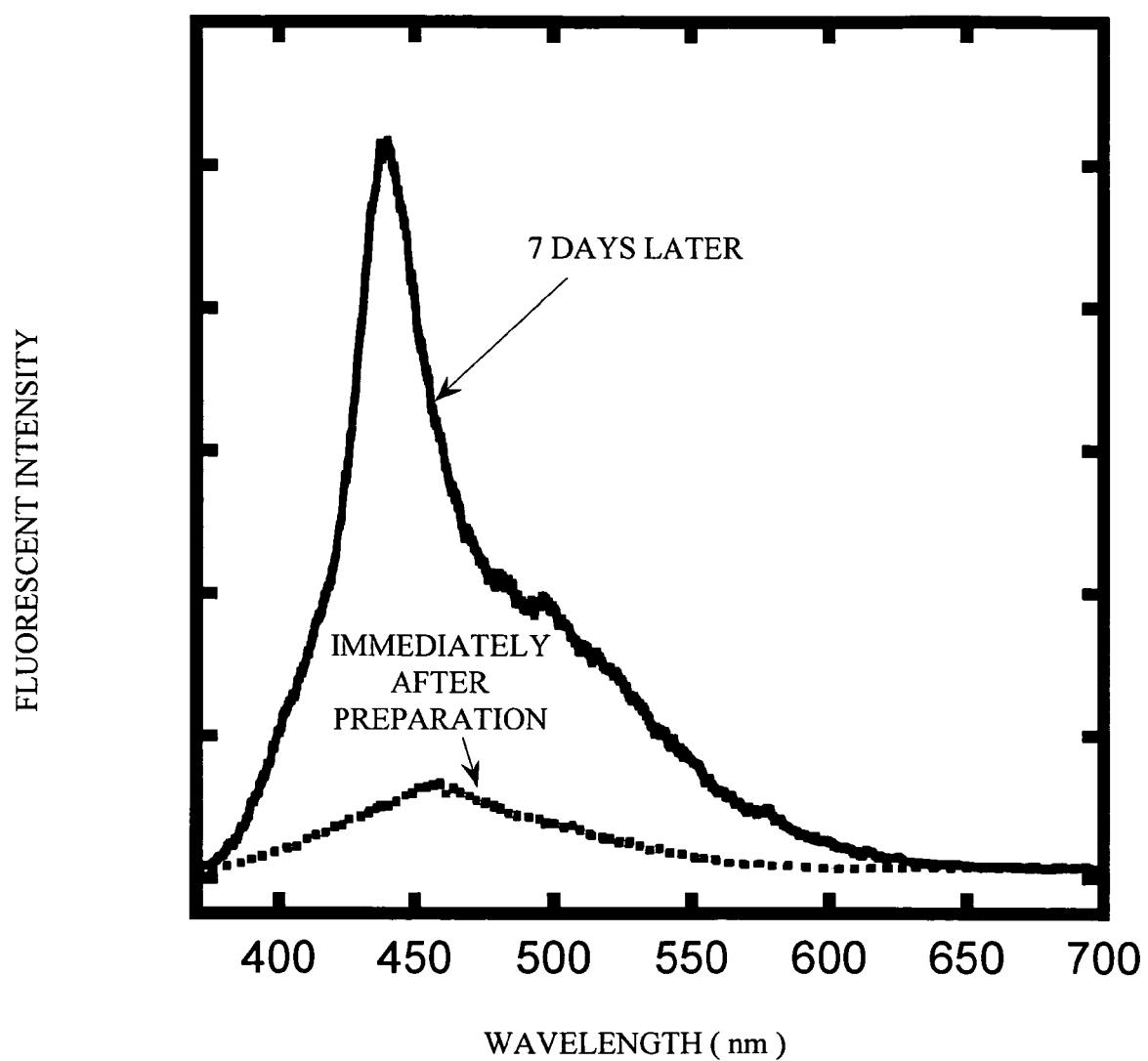
FIG. 18 shows the fluorescent spectrum of a semiconductor nanoparticle prepared in Example 9.

An aqueous solution of the purified and thiol-modified nanoparticles was diluted to an absorbance of 0.5 using an aqueous solution of 0.1 M tripropylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 17, and temporal changes in the fluorescent intensity are shown in FIG. 18.

EXAMPLE 10

Figure 19:
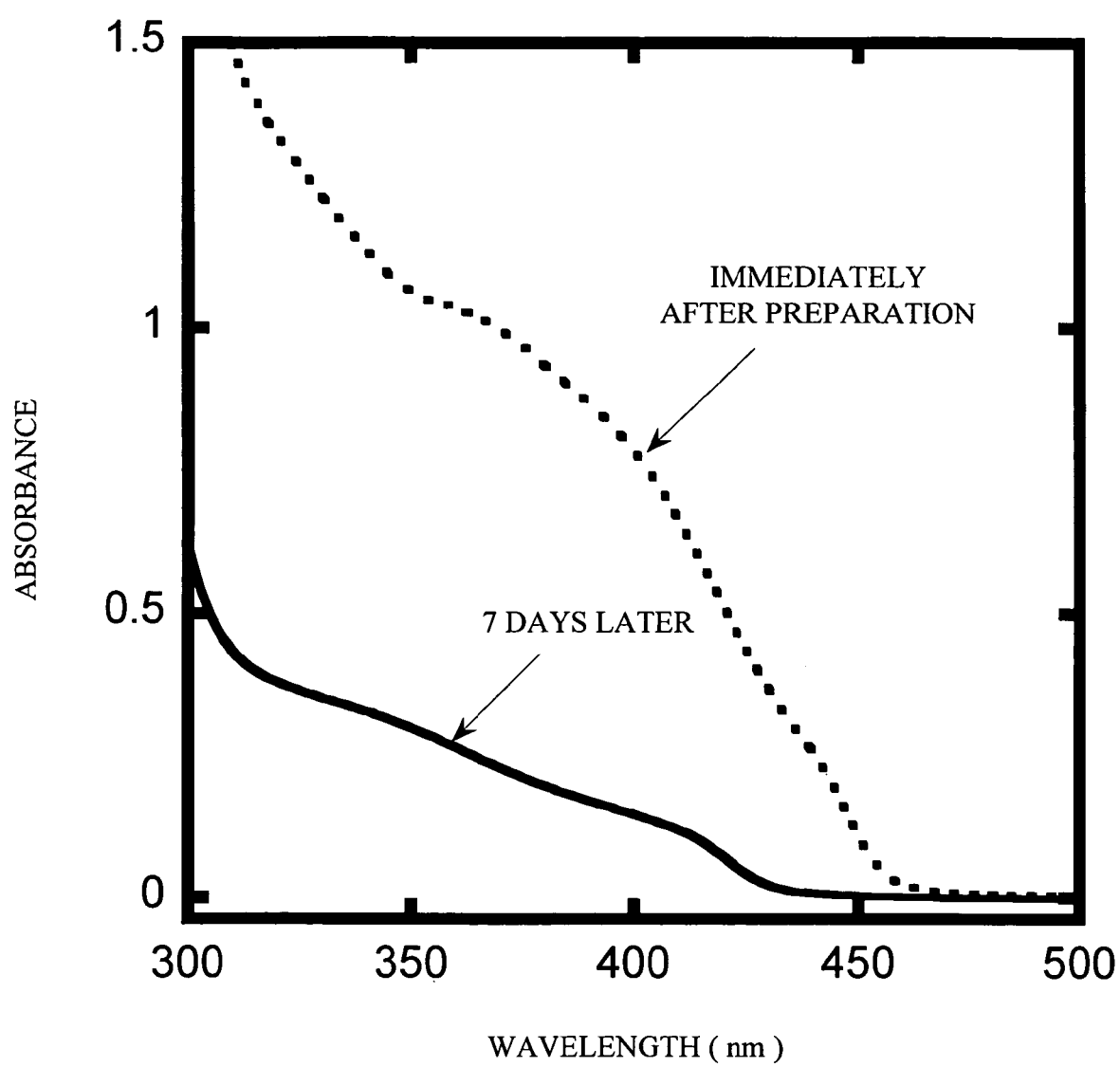
FIG. 19 shows the absorption spectrum of the semiconductor nanoparticle prepared in Example 10.
Figure 20:
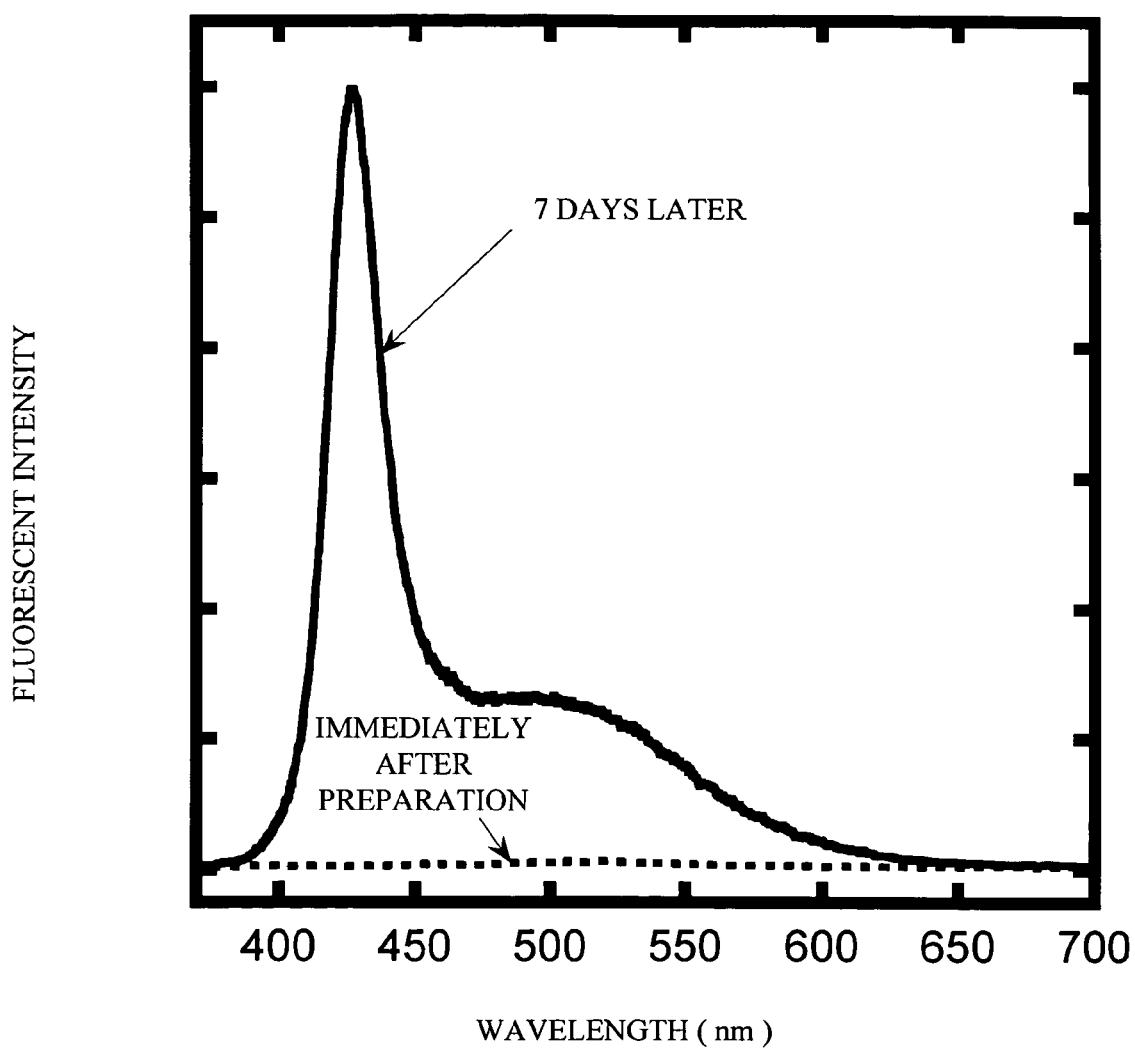
FIG. 20 shows the fluorescent spectrum of a semiconductor nanoparticle prepared in Example 10.

An aqueous solution of the purified and thiol-modified nanoparticles was diluted to an absorbance of 0.5 using an aqueous solution of 0.1 M tetrapropylamine-HCl of pH 11. The solution was allowed to stand for several days to several weeks, thereby obtaining a semiconductor nanoparticle solution with high-emission properties. The resultant solution was optically transparent yellow and had superior emission properties. Temporal changes in the absorbance in accordance with this preparation process are shown in FIG. 19, and temporal changes in the fluorescent intensity are shown in FIG. 20.

The stabilizing agent can be selected from a wide variety of substances that are available and is not therefore limited to the above-described examples.

The material of the core portion of the semiconductor nanoparticle is not particularly limited either. Examples of the core material include ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, and Si.

INDUSTRIAL APPLICABILITY

By arranging electron-releasing groups on the surface of the semiconductor nanoparticle core, a water-soluble semiconductor nanoparticle with superior fluorescent properties can be easily prepared.

The invention claimed is:

1. A water-soluble semiconductor nanoparticle consisting of: a core made of one chemical compound; a first layer which contains electron-releasing groups directly arranged on a surface of the core; and a second layer made of an ionic compound which is provided on the first layer in order to stablize the first layer, wherein said electron-releasing groups are of at least one type selected from the group consisting of —OR, —$OCH_2R$, —$OCOCH_2R$, —NHR, —$N(CH_2R)_2$, —$NHCOCH_2R$, —$CH_2R$, and —$C_6H_4R$, and R is one selected from the group consisting of hydrogen and substituted or unsubstituted hydrocarbon groups, wherein the ionic compound is of at least one type selected from the group consisting of ammonia, primary amines ($R^1NH_2$), secondary amines ($R^1Rith^2NH$), tertiary amines ($R^1R^2R^3N$), quaternary ammonium compounds ($R^4R^5R^6R^7N^+$), and $R^1$ to $R^7$ are each selected from the group consisting of hydrogen and substituted or unsubstituted hydrocarbon groups, wherein said first layer and said second layer are formed from two separate surface treatments, and wherein said semiconductor nanoparticle has a fluorescent property with increased bandgap fluorescence by decreasing defective fluorescence.

2. The semiconductor nanoparticle according to claim 1, wherein a material of the core of the semiconductor nanoparticle is selected from the group consisting of ZnO, ZnS, ZnSe, ZnTe, Cod, CdS, CdMnS, CdSe, CdMnSe, CdTe, CdMnTe, HgS, HgSe, HgTe, InP, InAs, InSb, InN, GaN, GaP, GaAs, GaSb, $TiO_2$, $WO_3$, PbS, PbSe, MgTe, AlAs, AlP, AlSb, AlS, Ge, and Si.

3. A fluorescent reagent comprising a semiconductor nanoparticle consisting of a core made of one chemical compound; a first layer which contains electron-releasing groups directly arranged on a surface of the core; and a second layer made of an ionic compound which is provided on the first layer in order to stablize the first layer, wherein said electron-releasing groups are of at least one type selected from the group consisting of —OR, —OCH$_2$R, —OCOCH$_2$R, —NHR, —N(CH$_2$R)$_2$, —NHCOCH$_2$R, —CH$_2$R, and —C$_5$H$_4$R, and R is one selected from the group consisting of hydrogen and substituted or unsubstituted hydrocarbon groups, wherein the ionic compound is of at least one type selected from the group consisting of ammonia, primary amines (R$^1$NH$_2$), secondary amines (R$^1$R$^2$NH), tertiary amines (R$^1$R$^2$R$^3$N), quaternary ammonium compounds (R$^4$R$^5$R$^6$R$^7$N$^+$), and R$^1$ to R$^7$ are each selected from the group consisting of hydrogen and substituted or unsubstituted hydrocarbon groups, wherein said first layer and said second layer are formed from two separate surface treatments, and wherein said semiconductor nanoparticle has a fluorescent property with increased bandgap fluorescence by decreasing defective fluorescence.

4. The fluorescent agent according to claim 3, wherein a material of the core of said semiconductor nanoparticle is selected from the group consisting of ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, TiO$_2$, WO$_3$, PbS, PbSe, MgTe, AlAs, AlP, AlSb, AlS, Ge, and Si.

5. The fluorescent agent according to claim 3, wherein said semiconductor nanoparticle is water-soluble.

6. An optical device comprising a water-soluble semiconductor nanoparticle consisting of a core made of one chemical compound; a first layer which contains electron-releasing groups directly arranged on a surface of die core; and a second layer made of an ionic compound which is provided on the first layer in order to stablize the first layer, wherein said electron-releasing groups are of at least one type selected from the group consisting of —OR, —OCH$_2$R, —OCOCH$_2$R, —NHR, —N(CH$_2$R)$_2$, —NHCOCH$_2$R, CH$_2$R, and —C$_6$H$_4$R, and R is one selected from the group consisting of hydrogen and substituted or unsubstituted hydrocarbon groups, wherein the ionic compound is of at least one type selected from the group consisting of ammonia, primary amines (R$^1$NH$_2$), secondary amines (R$^1$R$^2$NH), tertiary amines (R$^1$R$^2$R$^3$N), quaternary ammonium compounds (R$^4$R$^5$R$^6$R$^7$N$^+$), and R$^1$ to R$^7$ are each selected from the group consisting of hydrogen and substituted or unsubstituted hydrocarbon groups, wherein said first layer and said second layer are formed from two separate surface treatments, and wherein said semiconductor nanoparticle has a fluorescent property with increased bandgap fluorescence by decreasing defective fluorescence.

7. The optical device according to claim 6, wherein a material of the core of said semiconductor nanoparticle is selected from the group consisting of ZnO, ZnS, ZnSe, ZnTe, CdO, CdS, CdMnS, CdSe, CdMnSe, CdTe, CdMnTe, HgS, HgSe, HgTe, InP, InAs, InSb, InN, GaN, GaP, GaAs, GaSb, TiO$_2$, WO$_3$, PbS, PbSe, MgTe, AlAs, AlP, AlSb, AlS, Ge, and Si.

8. The optical device according to claim 6, wherein said semiconductor nanoparticle is water-soluble.

* * * * *